(12) United States Patent
Hsiao et al.

(10) Patent No.: US 11,249,605 B2
(45) Date of Patent: *Feb. 15, 2022

(54) TOUCH PANEL AND MANUFACTURING METHOD THEREOF

(71) Applicant: Cambrios Film Solutions Corporation, Tortola (VG)

(72) Inventors: Chung-Chin Hsiao, Zhubei (TW); Siou-Cheng Lien, Toufen (TW); Chi-Fan Hsiao, Taoyuan (TW)

(73) Assignee: Cambrios Film Solutions Corporation, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 16/943,072

(22) Filed: Jul. 30, 2020

(65) Prior Publication Data

US 2021/0041986 A1 Feb. 11, 2021

(30) Foreign Application Priority Data

Aug. 8, 2019 (CN) .......................... 201910730817.7

(51) Int. Cl.
*G06F 3/044* (2006.01)
*G06F 3/041* (2006.01)

(52) U.S. Cl.
CPC .......... *G06F 3/0445* (2019.05); *G06F 3/0446* (2019.05); *G06F 3/04164* (2019.05); *G06F 2203/04103* (2013.01); *G06F 2203/04111* (2013.01)

(58) Field of Classification Search
CPC .. G06F 3/0445; G06F 3/0446; G06F 3/04164; G06F 2203/04103; G06F 2203/04111; G06F 3/044; G06F 2203/04112
See application file for complete search history.

(56) References Cited

U.S. PATENT DOCUMENTS

| | | | | |
|---|---|---|---|---|
| 11,061,501 | B2* | 7/2021 | Hsiao | G06F 3/0446 |
| 2014/0104511 | A1* | 4/2014 | Liu | G06F 3/01 349/12 |
| 2014/0240620 | A1* | 8/2014 | Chiu | G06F 1/1626 349/12 |
| 2015/0030836 | A1* | 1/2015 | Ooga | B32B 37/182 428/220 |
| 2016/0320876 | A1* | 11/2016 | Son | G06F 3/0446 |
| 2019/0332210 | A1* | 10/2019 | Lee | G06F 3/044 |
| 2020/0301557 | A1* | 9/2020 | Hsiao | G06F 3/047 |

* cited by examiner

*Primary Examiner* — Md Saiful A Siddiqui
(74) *Attorney, Agent, or Firm* — Cooper Legal Group, LLC

(57) ABSTRACT

The touch panel includes the substrate, the first touch sensing electrode, the second touch sensing electrode, and the insulating layer. A first peripheral wire and a second peripheral wire are located at a peripheral area of the substrate. A first touch sensing electrode layer includes a first portion of a patterned first metal nanowire layer. The peripheral area includes a co-etched conductive layer and a second portion of the patterned first metal nanowire layer. The conductive layer and the second portion of the patterned first metal nanowire layer have a co-etched surface. The second touch sensing electrode is formed above the insulating layer and is connected with the second peripheral wire. The insulating layer may be made of a low dielectric constant material.

20 Claims, 21 Drawing Sheets

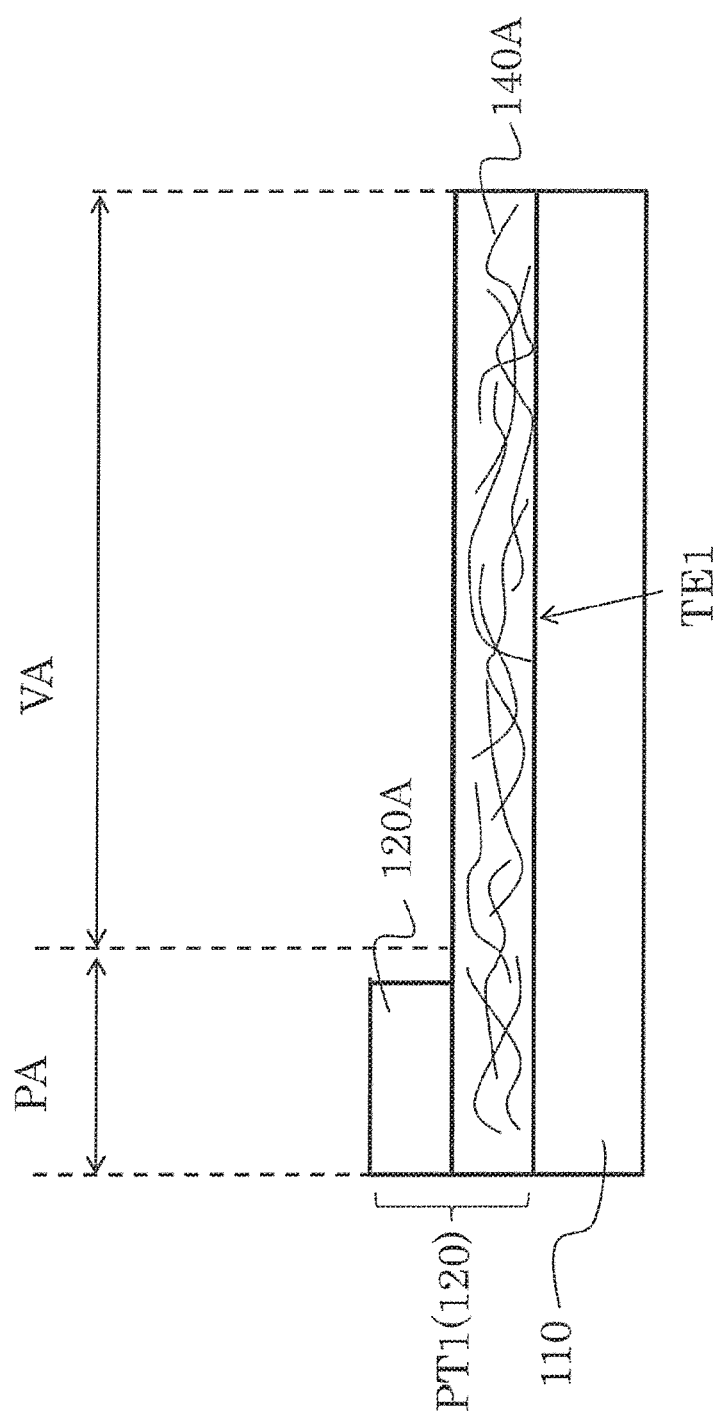

TOUCH PANEL AND MANUFACTURING METHOD THEREOF

CROSS-REFERENCE TO RELATED APPLICATION

This application claims priority to China Application Serial Number 201910730817.7, filed Aug. 8, 2019, which is herein incorporated by reference in its entirety.

BACKGROUND

Field of Disclosure

The present disclosure relates to a touch panel and manufacturing method thereof.

Description of Related Art

Because transparent conductors can have both light penetration and appropriate conductivity, they can be used in devices related to display panels or touch panels. Generally, transparent conductors can be various metal oxides, such as ITO (Indium Tin oxide), IZO (Indium Zinc Oxide), CTO (Cadmium Tin Oxide) or AZO (Aluminum-doped Zinc Oxide). However, some properties of these metal oxides thin films have made their implementation challenging, such as lack of flexibility. In some cases, the patterned metal oxides thin films may have problems that are easily observed by users. Thus, many kinds of transparent conductors have been developed, such as transparent conductors made of nanowires and other materials.

However, when fabricating a touch electrode with nanowires, there are many problems to be solved with the nanowires and metal lead wires in the peripheral area in both the process and structure. For example, components made of nanowires fail because of electromigration.

On the other hand, the touch sensor made of nanowires needs to reserve an aligning space in an adhesive process. As a result, the products cannot meet the demand of narrow frame.

Thus, in the process of fabricating touch sensing electrode with nanowires, it is necessary to re-design the electrode structure based on the properties of materials so that the products achieve a better performance.

SUMMARY

Some embodiments of the present disclosure provide methods to solve the problems of manufacturing the touch panel previously mentioned. The methods have the advantage of inhibiting the electromigration and extending the lifetime of silver nanowire components.

The present disclosure provides a touch panel having a display area and a peripheral area. The touch panel includes a substrate and a first touch sensing electrode disposed on a first surface of the substrate and located at the display area. The first touch sensing electrode includes a first portion of a patterned first metal nanowire layer. A first peripheral wire and a second peripheral wire are disposed on the first surface of the substrate and located at the peripheral area. The first peripheral wire is electrically connected with the first touch sensing electrode. The first peripheral wire and the second peripheral wire include a conductive layer and a second portion of the patterned first metal nanowire layer. The conductive layer and the second portion of the patterned first metal nanowire layer have a co-etched surface. The touch panel also includes an insulating layer covering the first touch sensing electrode and the second peripheral wire. The insulating layer includes a conductive hole disposed relative to the second peripheral wire, and the insulating layer is made of polymer with a dielectric constant lower than 3.5 or equal to 3.5 under a measuring condition. The second touch sensing electrode is disposed on the insulating layer, and the second touch sensing electrode includes a patterned second metal nanowire layer. The second touch sensing electrode is electrically connected with the second peripheral wire through the conductive hole. The measuring condition can be set to be 100 kHz, nearly 100 kHz or other frequencies or conditions.

In some embodiments of the present disclosure, the second portion of the patterned first metal nanowire layer is disposed on the first surface of the substrate. The conductive layer is disposed on the second portion of the patterned first metal nanowire layer, or the conductive layer is disposed on the first surface of the substrate. The second portion of the patterned first metal nanowire layer is disposed on a top surface of the conductive layer.

In some embodiments of the present disclosure, the touch panel further includes the first protective layer, which is disposed on the patterned first metal nanowire layer and/or the patterned second metal nanowire layer. The dielectric constant of the first protective layer is lower than 3.5 or equal to 3.5 under the measuring condition of 100 kHz. The first metal nanowire layer and/or the second metal nanowire layer may not directly contact with the first protective layer or the insulating layer having the dielectric constant lower than 3.5 or equal to 3.5.

In some embodiments of the present disclosure, the touch panel includes a pair of the second peripheral wires. The insulating layer includes a pair of conductive holes disposed relative to the pair of the second peripheral wires. The second touch sensing electrode is electrically connected with the pair of the second peripheral wires and forms a bridging structure.

In some embodiments of the present disclosure, the dielectric constant of the first protective layer is higher than 3.5 under the measuring condition of 100 kHz. Then, the patterned first metal nanowire layer and/or the patterned second metal nanowire layer does not directly contact with the materials with the dielectric constant lower than 3.5 or equal to 3.5.

In some embodiments of the present disclosure, the touch panel further includes an adhesive layer and/or a covering layer. The adhesive layer is made of optical clear adhesive with the dielectric constant lower than 3.5 or equal to 3.5 and under the measuring condition of 100 kHz. The adhesive layer also has the properties of transparency, anti-scratch, and improving the adhesion, which is the same as a general optical clear adhesive.

Some embodiments of the present disclosure provide a method of manufacturing a touch panel, including fabricating a first metal nanowire layer including metal nanowires on a first surface of a substrate. A conductive layer is fabricated on the first metal nanowire layer. Then a first patterning process is performed, including patterning the first metal nanowire layer located at the display area, and simultaneously patterning the conductive layer and the first metal nanowire layer located at the peripheral area to form a first peripheral wire and a second peripheral wire. Then the conductive layer located at the display area is removed to expose a first touch sensing electrode formed by patterning the first metal nanowire layer located at the display area. An insulating layer is fabricated to cover the first touch sensing electrode and the second peripheral wire. The insulating layer includes a conductive hole disposed relative to the second peripheral wire, and the insulating layer is made of a material with a dielectric constant lower than 3.5 or equal to 3.5 under a measuring condition of 100 kHz. Then a second touch sensing electrode is fabricated on the insulating layer. The second touch sensing electrode is electrically connected with the second peripheral wire through the conductive hole.

In some embodiments of the present disclosure, the fabricating the second touch sensing electrode on the insulating layer includes fabricating a second metal nanowire layer including metal nanowires on the insulating layer and performing a second patterning process to form the second touch sensing electrode by patterning the second metal nanowire layer.

In some embodiments of the present disclosure, the removing the conductive layer located at the display area includes removing the conductive layer located at the display area by using a first etchant.

In some embodiments of the present disclosure, the performing the first patterning process includes simultaneously etching the conductive layer and the first metal nanowire layer by using a second etchant.

In some embodiments of the present disclosure, a first protective layer is included. The dielectric constant of the first protective layer is lower than 3.5 or equal to 3.5 under the measuring condition of 100 kHz, or the dielectric constant of the first protective layer is higher than 3.5 under the measuring condition of 100 kHz. The first protective layer is between the first metal nanowire layer and the polymer with the dielectric constant lower than or equal to 3.5 so that the first metal nanowire layer does not directly contact with the polymer with the dielectric constant lower than or equal to 3.5. In some embodiments of the present disclosure, the dielectric constant of the first protective layer is higher than 3.5 under the measuring condition of 100 kHz. The second protective layer is between the second metal nanowire layer and the polymer with the dielectric constant lower than or equal to 3.5 so that the first metal nanowire layer does not directly contact with the polymer with the dielectric constant lower than or equal to 3.5.

In some embodiments of the present disclosure, the first metal nanowire layer or the second metal nanowire layer further includes a first protective layer. The dielectric constant of the first protective layer is lower than or equal to 3.5 under the measuring condition of 100 kHz.

In some embodiments of the present disclosure, an adhesive layer and/or a covering layer are/is included. The adhesive layer is made of optical clear adhesive with the dielectric constant lower than 3.5 or equal to 3.5 and under the measuring condition of 100 kHz.

In some embodiments of the present disclosure, a second protective layer is included. The second protective layer is made of the polymer with dielectric constant lower than or equal to 3.5 under the measuring condition of 100 kHz. An opening is formed on the second protective layer and the insulating layer to expose the peripheral wire.

In some embodiments of the present disclosure, the top of the second protective layer further includes an adhesion layer and/or a covering layer.

Some embodiments of the present disclosure provide a method of manufacturing a touch panel, including fabricating a conductive layer on a first surface of a substrate. The conductive layer located at the display area is removed. Then a first metal nanowire layer including metal nanowires is fabricated on the first surface of the substrate and on a surface of the conductive layer. Then a first patterning process is performed, including patterning the first metal nanowire layer located at the display area to form a first touch sensing electrode and simultaneously patterning the conductive layer and the first metal nanowire layer located at the peripheral area to form the first peripheral wire and a second peripheral wire. An insulating layer is fabricated to cover the first touch sensing electrode and the second peripheral wire, in which the insulating layer includes a conductive hole disposed relative to the second peripheral wire. The insulating layer is made of a material with a dielectric constant lower than 3.5 or equal to 3.5 under a measuring condition of 100 kHz. A second touch sensing electrode is fabricated on the insulating layer, and the second touch sensing electrode is electrically connected with the second peripheral wire through the conductive hole.

In some embodiments of the present disclosure, the fabricating the second touch sensing electrode on the insulating layer includes fabricating a second metal nanowire layer including metal nanowires on the insulating layer, and performing a second patterning process to form the second touch sensing electrode by patterning the second metal nanowire layer.

In some embodiments of the present disclosure, the removing the conductive layer located at the display area includes removing the conductive layer located at the display area by using a first etchant.

In some embodiments of the present disclosure, the performing the first patterning process includes simultaneously etching the conductive layer and the first metal nanowire layer by using a second etchant.

In some embodiments of the disclosure, the performing a patterning step includes etching the conductive layer and the metal nanowire layer by using a second etchant.

Some embodiments of the present disclosure provide a touch panel having a display area and a peripheral area. The touch panel includes a substrate and a first touch sensing electrode disposed on a first surface of the substrate and located at the display area. The first touch sensing electrode includes a first portion of a patterned first metal nanowire layer. A first peripheral wire and a second peripheral wire are disposed on the first surface of the substrate and located at the peripheral area. The first peripheral wire is electrically connected with the first touch sensing electrode. The first peripheral wire and the second peripheral wire include a conductive layer and a second portion of the patterned first metal nanowire layer. The conductive layer and the second portion of the patterned first metal nanowire layer have a co-etched surface. The touch panel also includes an insulating layer covering the first touch sensing electrode and the second peripheral wire. The insulating layer includes a conductive hole disposed relative to the second peripheral wire. A second touch sensing electrode is disposed on the insulating layer. The second touch sensing electrode includes a patterned second metal nanowire layer. The second touch sensing electrode is electrically connected with the second peripheral wire through the conductive hole. The first metal nanowire layer or the second metal nanowire layer further includes a first protective layer. The first protective layer is made of a material with dielectric constant lower than or equal to 3.5 under a measuring condition of 100 kHz.

Some embodiments of the present disclosure provide a touch panel having a display area and a peripheral area. The touch panel includes a substrate and a first touch sensing electrode disposed on a first surface of the substrate and located at the display area. The first touch sensing electrode includes a first portion of the patterned first metal nanowire layer. A first peripheral wire and a second peripheral wire are disposed on the first surface of the substrate and located at the peripheral area. The first peripheral wire is electrically connected with the first touch sensing electrode. The first peripheral wire and the second peripheral wire include a conductive layer and a second portion of the patterned first metal nanowire layer. The conductive layer and the second portion of the patterned first metal nanowire layer have a co-etched surface. The touch panel also includes an insulating layer covering the first touch sensing electrode and the second peripheral wire. The insulating layer includes a conductive hole disposed relative to the second peripheral wire. The second touch sensing electrode is disposed on the insulating layer. The second touch sensing electrode includes a patterned second metal nanowire layer. The second touch sensing electrode is electrically connected with the second peripheral wire through the conductive hole. The touch panel includes a second protective layer. The second protective layer is made of a material with dielectric constant lower than or equal to 3.5 under the measuring condition of 100 kHz.

It is to be understood that both the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, but the described embodiments are not intended to limit the presently claimed invention.

FIG. 4C is the cross-sectional diagram along line B-B of FIG. 4A.

DETAILED DESCRIPTION

The following disclosure provides many different embodiments, or examples, for implementing different features of the provided subject matter. For clarity, many practical details are presented in the following description. However, it should be understood that these practical details should not be used to limit the presently claimed invention. That is, in some embodiments of the disclosure, these practical details are not necessary. In addition, to simplify the figures, some existing conventional structures and elements will be represented in simple form in the figures.

The terms "about" or "approximately" in the following description generally refers to the error or range of numerous values being within 20%, preferably within 10%, more preferably within 5%. In the absence of an explicit statement in the description, the mentioned values are referred to as approximations (i.e., having errors or ranges represented by "about" or "approximately"). In addition, the terms "pattern", "graphic", "drawing" represent the same or similar meanings. For the convenience of illustration, the terms will be used interchangeably in the following description. The low dielectric constant materials used in the disclosure, include but are not limited to, materials having a dielectric constant lower than or equal to 3.5 under the measuring condition of 100 kHz. Thus, low dielectric constant materials having a dielectric constant lower than or equal to 3.5 under the measuring condition but not listed in the description are also included in the scope of the disclosure.

Figure 1:
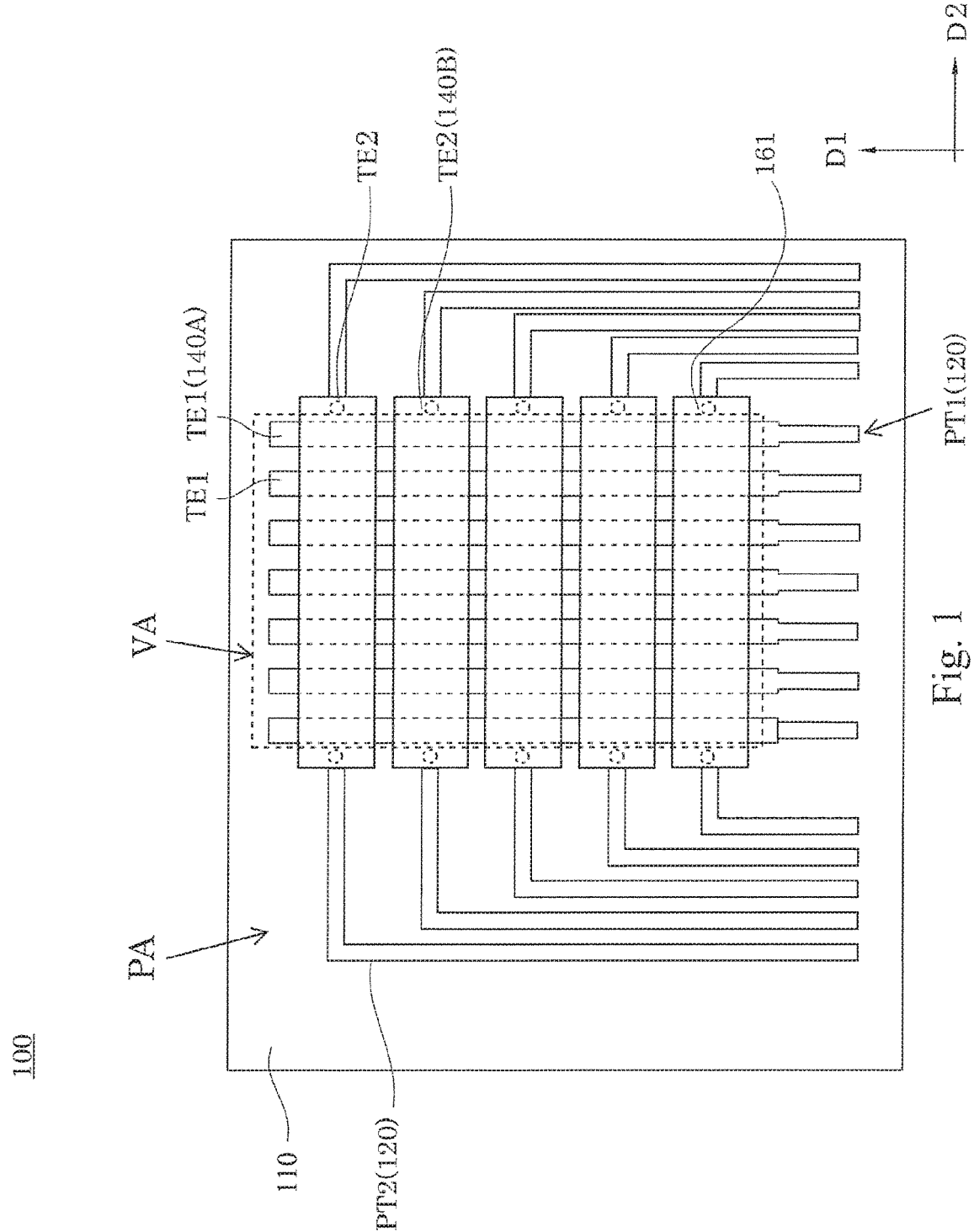
FIG. 1 is the schematic diagram of the touch panel according to some embodiments of the present disclosure.

The example of the present disclosure provides a touch panel 100, as shown in FIG. 1. The touch panel 100 includes a substrate 110, a peripheral wire 120, a first touch sensing electrode TE1 including a first metal nanowire layer 140A, a second touch sensing electrode TE2 including a second metal nanowire layer 140B, and an insulating layer 160 (as shown in FIG. 6B) disposed between the first touch sensing electrode TE1 and the second touch sensing electrode TE2. The first touch sensing electrode TE1 and the second touch sensing electrode TE2 are electrically connected with the peripheral wire 120. The peripheral wire 120 may include a conductive layer 120A and the first metal nanowire layer 140A (as shown in FIG. 6B). The number of peripheral wires 120, first touch sensing electrodes TE1, and second touch sensing electrodes TE2 may be one or more. The following examples and the amounts illustrated in the figures are only for description, rather than limiting the present disclosure.

Referring to FIG. 1, the substrate 110 may have a display area VA and a peripheral area PA. The peripheral area PA is disposed at the side of the display area VA; for example, the peripheral area PA may be disposed at a framed area around the display area VA (i.e. including the right, left, upper, and lower sides). However, in other examples, the peripheral area PA may be an L-shaped area disposed at the left and lower sides of the display area VA. Moreover as shown in FIG. 1, there are a total of 7 groups of first peripheral wires PT1 and 5 groups of second peripheral wires PT2 at both left and right sides disposed at the peripheral area PA of the substrate 110. The first touch sensing electrode TE1 and the second touch sensing electrode TE2 are approximately disposed at the display area VA of the substrate 110.

Figure 2:
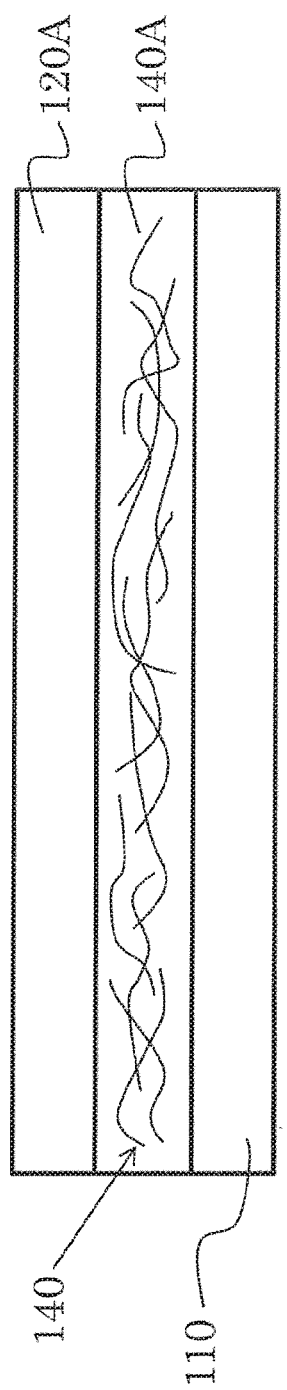
FIG. 2 is the schematic diagram of the first step of the method of manufacturing the touch panel according to some embodiments of the present disclosure.

The method of manufacturing the touch panel of the embodiment may include the following steps: providing the substrate 110; depositing the first metal nanowire layer 140A including the metal nanowire 140 on the substrate 110; proceeding with a patterning step to form the first touch sensing electrode TE1, and simultaneously forming the peripheral wire 120. The specific process of the method of manufacturing the touch panel of the embodiment may be discussed in the following. Firstly, referring to FIG. 2, the substrate 110 is provided, and, in some embodiments of the preset disclosure, the substrate 110 may be a transparent substrate. In detail, the substrate 110 can be a rigid transparent substrate or a flexible transparent substrate, in which the material can be selected from glass, PMMA (polymethylmethacrylate), PVC (polyvinyl chloride), PP (polypropylene), PET (polyethylene terephthalate), PEN (polyethylene naphthalate), PC (polycarbonate), PS (polystyrene), and etc.

Then, referring to FIG. 2 again, the first metal nanowire layer 140A and the conductive layer 120A are manufactured on the substrate 110. The first metal nanowire layer 140A can at least include the metal nanowire 140. In the example, the specific manufacturing method of the first metal nanowire layer 140A can be as the follows. A dispersion or an ink having the metal nanowire 140 is formed on the first surface (e.g., the top surface) by coating, and the metal nanowire 140 attaches to the surface of the substrate 110 after drying. In other words, the metal nanowire 140 becomes the first metal nanowire layer 140A on the substrate 110 because of the steps of drying and solidifying. The display area VA and the peripheral area PA can be defined on the substrate 110, and the peripheral area PA is disposed at the side of the display area VA. The first metal nanowire layer 140A can include a first portion formed at the display area VA and a second portion formed at the peripheral area PA. In detail, in the display area VA, the first portion of the first metal nanowire layer 140A can be directly formed on the surface of the substrate 110. In the peripheral area PA, the second portion of the first metal nanowire layer 140A can be directly formed on the surface of the substrate 110.

In the example of the disclosure, the dispersion having the metal nanowire 140 can be solvent, such as water, alcohols, ketones, ethers, hydrocarbon, or aromatic solvents (benzene, toluene, xylene, etc.). The dispersion can also include additives, surfactants, or adhesives, such as CMC (carboxymethyl cellulose), HEC (hydroxyethyl Cellulose), HPMC (hydroxypropyl methylcellulose), sulfonic acid ester, sulphate, disulfonate, sulfonate succinate, phosphate ester or fluorine-containing surfactant, and etc. The first metal nanowire layer 140A can include, for example, silver nanowire layer, gold nanowire layer, or copper nanowire layer. In detail, the term "metal nanowire" used in the description is a collective term for a collection of metal wires including a plurality of elemental metals, metal alloys, or metal compounds (including metal oxides). The included amounts of metal nanowires do not affect the scope of the present disclosure. At least one cross-sectional size (diameter of the cross-section) of a single metal nanowire is less than 500 nm, preferably less than 100 nm, and more preferably less than 50 nm. The metal nanostructure is referred to herein as "wire" if the aspect ratio is high, for example, from 10 and 100,000. To be more specific, the aspect ratio of the metal nanowire (length: diameter of the cross-section) can be higher than 10, preferably higher than 50, and more preferably higher than 100. The metal nanowire can be any metal, including (but not limited to) silver, gold, copper, nickel, and gold-plated silver. Other terms, such as silk, fiber, tube (e.g., carbon nanotube), etc., which have the same size and high aspect ratio as described above, are also included in the scope of the present disclosure.

The dispersion or ink having the metal nanowire 140 can be formed on the surface of the substrate 110 by any way, for example but not limitation: processes such as screen printing, sprinkler coating, and roller coating. In one example, a roll to roll process can be adopted to continuously provide the dispersion or ink having the metal nanowire 140 to the surface of the substrate 110. After the solidifying/drying steps, substances such as solvents are volatilized, and metal nanowire 140 will be randomly distributed on the surface of the substrate 110. Preferably, the metal nanowire 140 does not drop off to form the first metal nanowire layer 140A but instead fixes on the surface of the substrate 110. The metal nanowire 140 can contact with each other to provide continuous current path and form a conductive network.

In some embodiments of the present disclosure, the metal nanowire 140 can be silver nanowires or silver nanofibers, which have an average diameter of about 20 to 100 nanometers and an average length of 20 to 100 micrometers. Preferably, the average diameter will be about 20 to 70 nanometers, and the average length will be about 20 to 70 micrometers (i.e. aspect ratio of 1000). In some embodiments, the diameter of the metal nanowire 140 will be from 70 to 80 nanometers, and the length will be about 8 micrometers.

In one example, a first protective layer (overcoat, not shown) can be disposed on the first metal nanowire layer 140A. After solidifying, the first protective layer and the first metal nanowire layer 140A form a composite structure layer. In one example, suitable polymers or a mixture thereof can be formed on the first metal nanowire layer 140A by a coating method. The polymers infiltrate into the metal nanowire 140 to form fillers, and the first protective layer is formed by a solidifying step. In other words, the metal nanowire 140 can be regarded as embedded in the first protective layer. In one specific example, the solidifying step can be: forming the first protective layer on the first metal nanowire layer 140A by heating and baking (e.g., at about 60° C. to about 150° C.). The disclosure is not intended to limit the physical structure between the first protective layer and the first metal nanowire layer 140A. For example, the first protective layer and the first metal nanowire layer 140A can be stacked in two layers or can be combined with each other to form a composite layer. Preferably, the metal nanowire 140 can be embedded in the first protective layer to form a composite pattern, which is patterned in the subsequent process.

Preferably, the aforementioned polymers give certain chemical, mechanical, and optical properties to the metal nanowire 140. For example, adhesion between the metal nanowire 140 and the substrate 110 or better physical mechanical strength is provided. Therefore, the first protective layer can be referred to as matrix. In yet another embodiment, the first protective layer can be formed by certain polymers, so that the metal nanowire 140 has extra surface protection related to anti-scratching and wearing. For example, polyacrylate, epoxy resin, polyamino-formate, polysilane, polysiloxane, poly(silicon-acrylic acid), etc. can be used to give the metal nanowire 140 higher surface strength to improve the scraping resistance. Moreover, a crosslinking agent, a polymerization inhibitor, a stabilizer (for example but not limited to antioxidants and ultraviolet (UV) stabilizers), surfactants, or analogues or mixtures of the elements mentioned above can be added to the polymers to improve the UV resistance of the composite structure CS or achieve a longer shelf life.

In one example, the polymers forming the first protective layer can be low dielectric materials. For example, under the measuring condition of 100 kHz, polymers of dielectric constant lower than 3.5 are chosen to form the first protective layer. As mentioned above, the first protective layer with low dielectric constant can directly contact with the first metal nanowire layer 140A to form a double-layer stack. Or, the first protective layer with low dielectric constant can be combined with the first metal nanowire layer 140A to form a composite layer. The low dielectric materials include, but are not limited to, resin such as acrylic, etc.

The specific manufacturing method of the conductive layer 120A of the example is: forming the metal material on the first metal nanowire layer 140A by a proper process. For example, but not limitation, a non-transparent metal with good conductivity (such as a single layer of silver, copper, or multilayer materials, such as molybdenum/aluminum/molybdenum, copper/nickel, titanium/aluminum/titanium, or molybdenum/chromium) is formed on the first metal nanowire layer 140A. Similar to the first metal nanowire layer 140A, the conductive layer 120A can include the first portion formed on the display area VA and the second portion formed on the peripheral area PA. The first portion of the conductive layer 120A will be removed in a subsequent process, and the second portion of the conductive layer 120A and the second portion of the first metal nanowire layer 140A will be patterned to form the peripheral wire 120 in the subsequent process.

Figure 3:
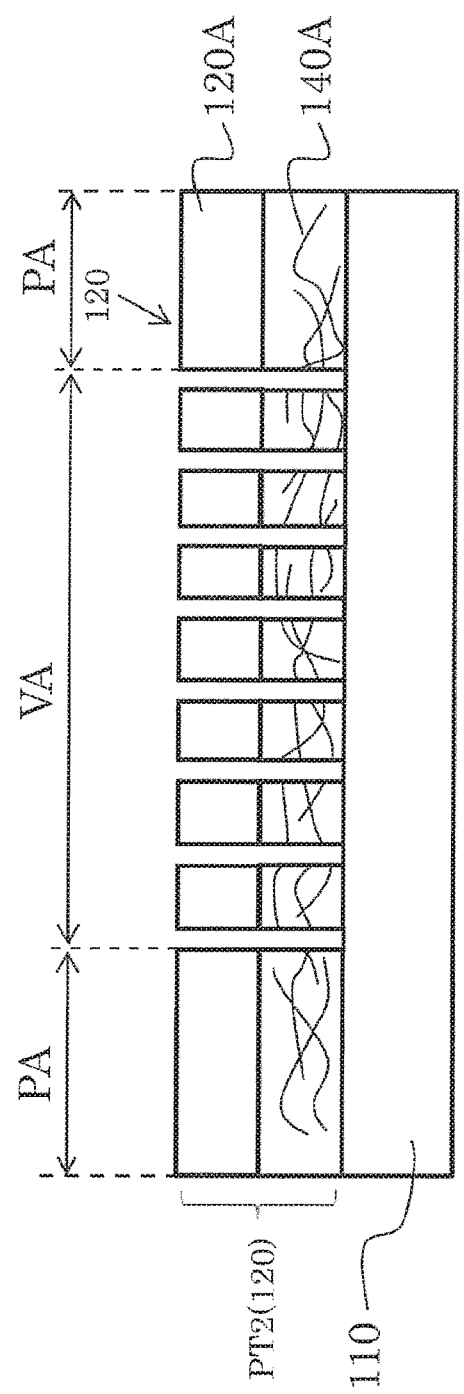
FIG. 3 is the schematic diagram of the second step of the method of manufacturing the touch panel according to some embodiments of the present disclosure.

The first patterning step is then performed, which mainly patterns the conductive layer 120A and the first metal nanowire layer 140A to form the pattern of the first touch sensing electrode TE1. Simultaneously, the conductive layer 120A and the first metal nanowire layer 140A located at the peripheral area PA are patterned to form the peripheral wire 120, as shown in FIG. 3. An example can specifically include the following steps: exposing/developing (i.e. lithography process) the photosensitive material (such as photoresist) to define the pattern of the first touch sensing electrode TE1 located at the display area VA and the pattern of peripheral wire 120 located at the peripheral area PA. Then, etching is performed to form the pattern of the first touch sensing electrode TE1 including the first metal nanowire layer 140A (i.e. the first portion of the first metal nanowire layer 140A) on the display area VA. Then, the peripheral wire 120 including the first metal nanowire layer 140A (i.e. the second portion of the first metal nanowire layer 140A) and the conductive layer 120A (i.e. the second portion of the conductive layer 120A) is formed on the peripheral area PA.

In one example, an etchant (i.e. the first etchant) that is able to co-etch the first metal nanowire layer 140A and the conductive layer 120A is adopted, in order to manufacture the first touch sensing electrode TE1 and the peripheral wire 120 in the same process. Therefore, the connection of the first touch sensing electrode TE1 of the display area VA and the peripheral wire 120 of the peripheral area PA can be completed with the minimum times of alignment (for example, once). Thus, the low yield caused by traditional multiple alignments can be avoided, and the alignment tolerance reserved for the alignment process can be saved, so that the width of the peripheral wire 120 can be reduced as far as possible to meet the demand of the narrow frame of the displayer.

According to one specific example, under the condition of the first metal nanowire layer 140A being a nano-silver layer and the conductive layer 120A being a copper layer, the first etchant can be adopted to etch copper and silver. For example, the principal component of the etchant includes $HNO_3$ (5% to 15%) and $H_3PO_4$ (55% to 70%) to remove copper and silver in the same process. In another specific example, an additive, such as a selective ratio regulator, can be added to the principal component of the etchant to adjust the rate of etching copper and silver. For example, 5% to 10% of BTA (benzotriazole) can be added to the etchant with the principal component including $HNO_3$ (5% to 15%) and $H_3PO_4$ (55% to 70%) to solve the problem of over-etching.

Then the second patterning step is performed, which mainly patterns the conductive layer 120A to remove the metal materials in the display area VA and expose the first touch sensing electrode TE1 formed after patterning the first metal nanowire layer 140A. The example specifically includes the following steps: exposing/developing (i.e. lithography process) the photosensitive materials (such as photoresist) to define the pattern to expose the first portion of the conductive layer 120A located at the display area VA. Then, etching is performed to remove the first portion of the conductive layer 120A located at the display area VA, in order to expose the first metal nanowire layer 140A on the display area VA (at this time, the first metal nanowire layer 140A has the pattern, which shows the first touch sensing electrode TE1).

In the etching steps mentioned above, for example, when the first metal nanowire layer 140A is the nano-silver layer and the conductive layer 120A is the copper layer, the second etchant can be configured to etch copper, while the etching rate of nano-silver is significantly lower to avoid the influence of copper etchant on the nano-silver layer. In one specific example, the copper etchant mainly includes $CH_3COOH$ and $NH_4OH$, in which the composition etches silver nanowire much more slowly than copper (e.g. a ratio of an etching rate of silver to copper is 1:100 to 1:10000). In one example, after being treated with the etchant, the resistance variation of the first metal nanowire layer 140A is below 10%.

In another example, the step of removing the conductive layer 120A located at the display area VA can be performed first. Then the second patterning step is performed, which mainly patterns the first metal nanowire layer 140A located at the display area VA to form the first touch sensing electrode TE1, and simultaneously patterns the conductive layer 120A and the first metal nanowire layer 140A located at the peripheral area PA to form the peripheral wire 120.

Figure 4A:
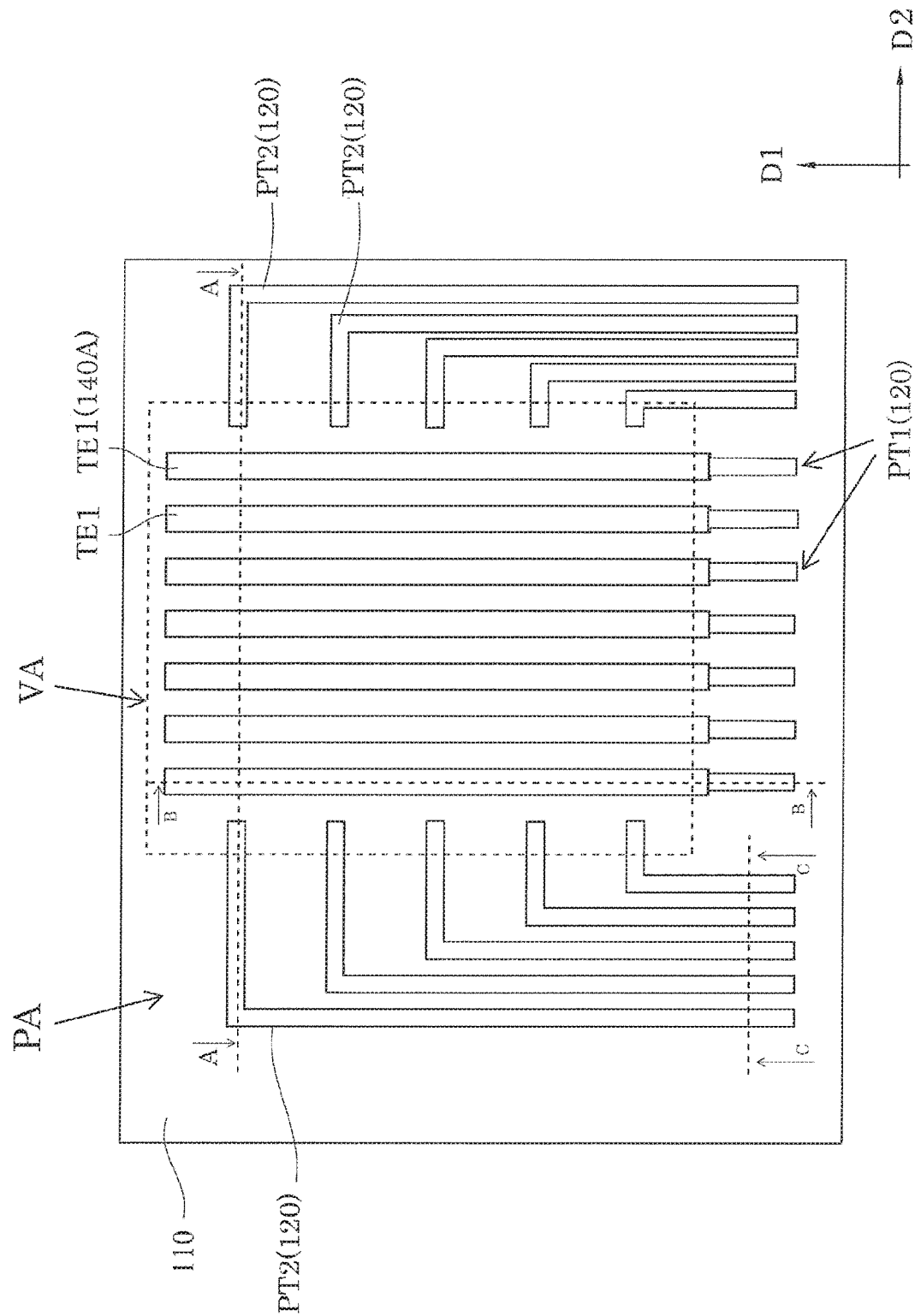
FIG. 4A is the schematic diagram of the third step of the method of manufacturing the touch panel according to some embodiments of the present disclosure.
Figure 4B:
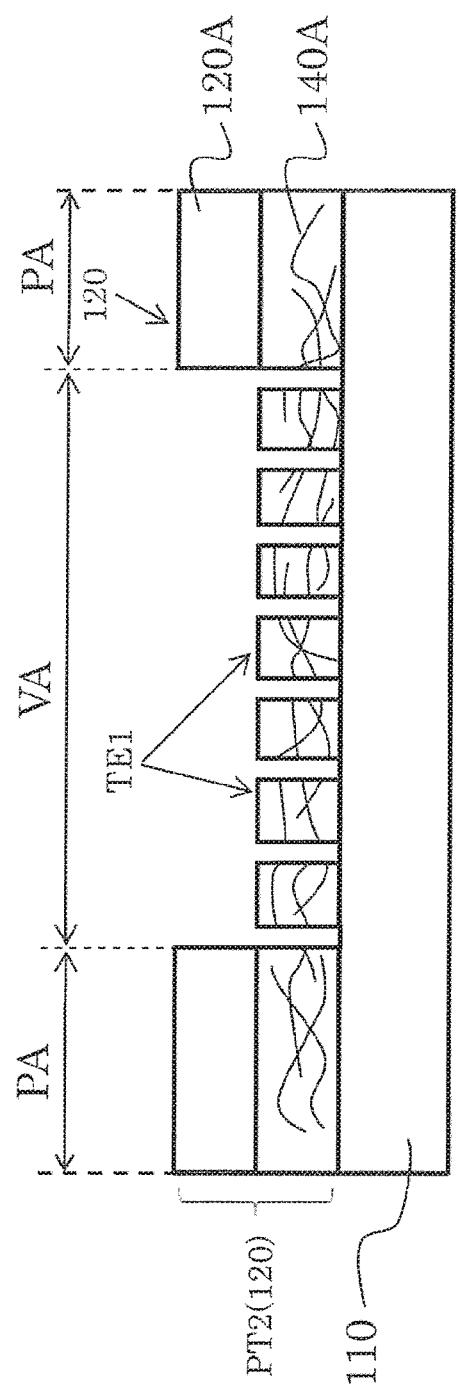
FIG. 4B is the cross-sectional diagram along line A-A of FIG. 4A.

FIG. 4A displays the patterned structures of the two steps mentioned above. The first touch sensing electrode TE1 is formed by the first metal nanowire layer 140A on the display area VA (i.e. the first portion of the first metal nanowire layer 140A). The peripheral wire 120 on the peripheral area PA is formed by the first metal nanowire layer 140A (i.e. the second portion of the first metal nanowire layer 140A) and the conductive layer 120A (i.e. the second portion of the conductive layer 120A). In addition, referring to FIG. 4A, FIG. 4B and FIG. 4C at the same time, the peripheral wire 120 can include the first peripheral wire PT1 and the second peripheral wire PT2. The first touch sensing electrode TE1 is electrically connected with the first peripheral wire PT1. The second peripheral wire PT2 will be connected with the second touch sensing electrode TE2 formed in the subsequent steps. The location and pattern of the peripheral wire 120 can be designed based on the actual product. For example, the first peripheral wire PT1 is not limited to be formed on one side of the first touch sensing electrode TE1, but also can be formed on both sides of the first touch sensing electrode TE1. The second peripheral wire PT2 is not limited to being formed on both sides of the second touch sensing electrode TE2, but also can be formed on one side of the second touch sensing electrode TE2. In another example, the first touch sensing electrode TE1 can be formed by the first metal nanowire layer 140A and the first protective layer. The peripheral wire 120 on the peripheral area PA can be formed by the first metal nanowire layer 140A, the first protective layer, and the conductive layer 120A.

Figure 5A:
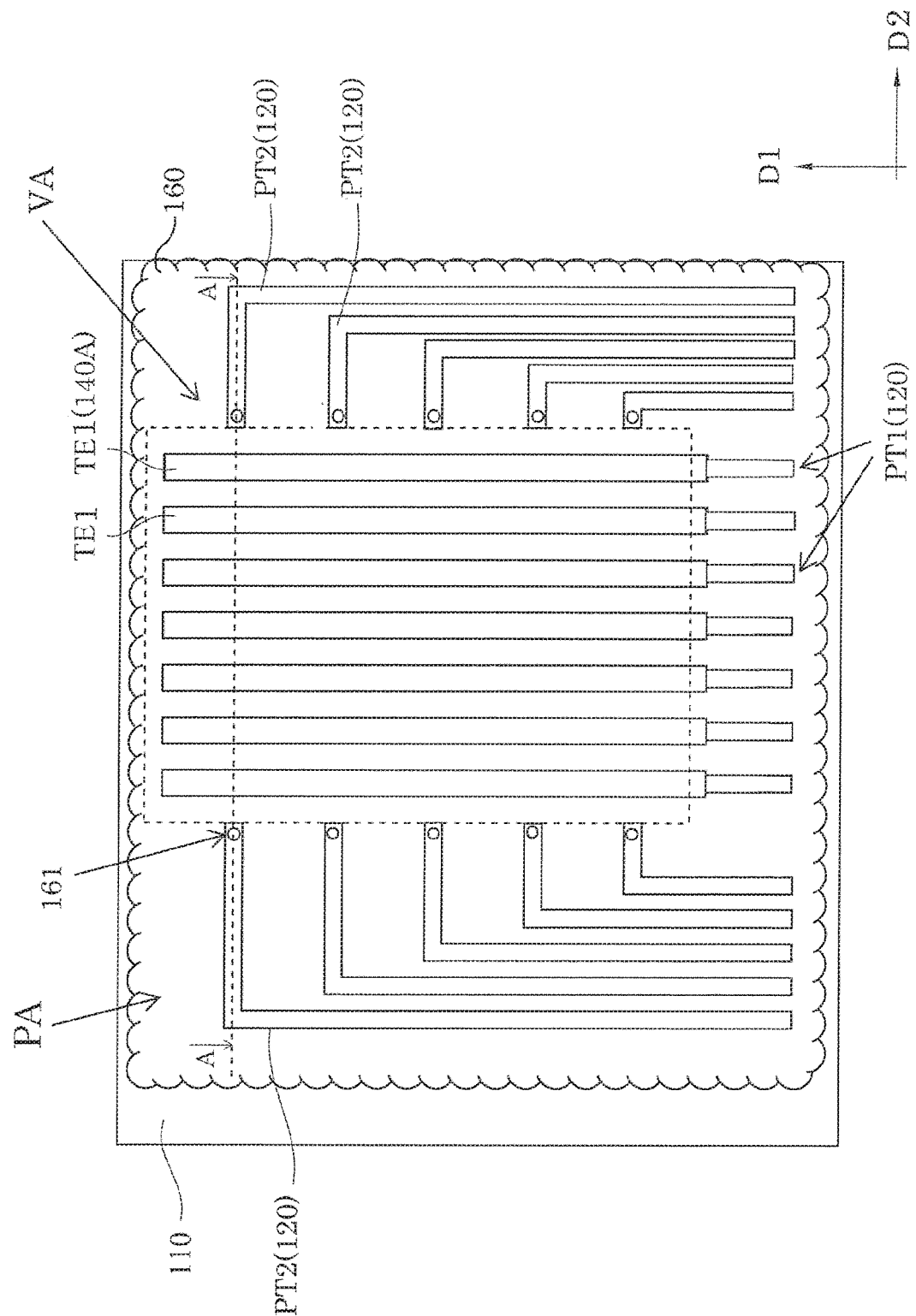
FIG. 5A is the schematic diagram of the fourth step of the method of manufacturing the touch panel according to some embodiments of the present disclosure.

Then, the insulating layer 160 is manufactured, and the conductive hole 161 is manufactured in the insulating layer 160, as shown in FIG. 5A. In one example, the insulating material (such as $SiO_2$, etc.) can cover the first metal nanowire layer 140A and the conductive layer 120A. In other words, the first touch sensing electrode TE1 located at the display area VA and the peripheral wire 120 located at the peripheral area PA (including the first peripheral wire PT1 and the second peripheral wire PT2) are both covered by the insulating layer 160. In one example, the insulating layer 160 can only cover the first touch sensing electrode TE1 and the second peripheral wire PT2.

In one example, the material forming the insulating layer 160 can be low-k material, such as a low-k polymer. For example, under the measuring condition of 100 kHz, the low-k insulating layer 160 can directly contact with the first metal nanowire layer 140A. Or, a low-k material stack of at least one layer (e.g. two layers) can be formed on the first metal nanowire layer 140A. For example, the first metal nanowire layer 140A can have the first protective layer and the insulating layer with low-k. Or, the low-k insulating layer 160 cannot directly contact with the first metal nanowire layer 140A. For example, the first metal nanowire layer 140A can have the first protective layer without low-k (e.g. a polymer with a dielectric constant higher than 3.5 under the measuring condition of 100 kHz) and the low-k insulating layer 160. The low-k material can include, but is not limited to, resin such as acrylic.

Figure 10:
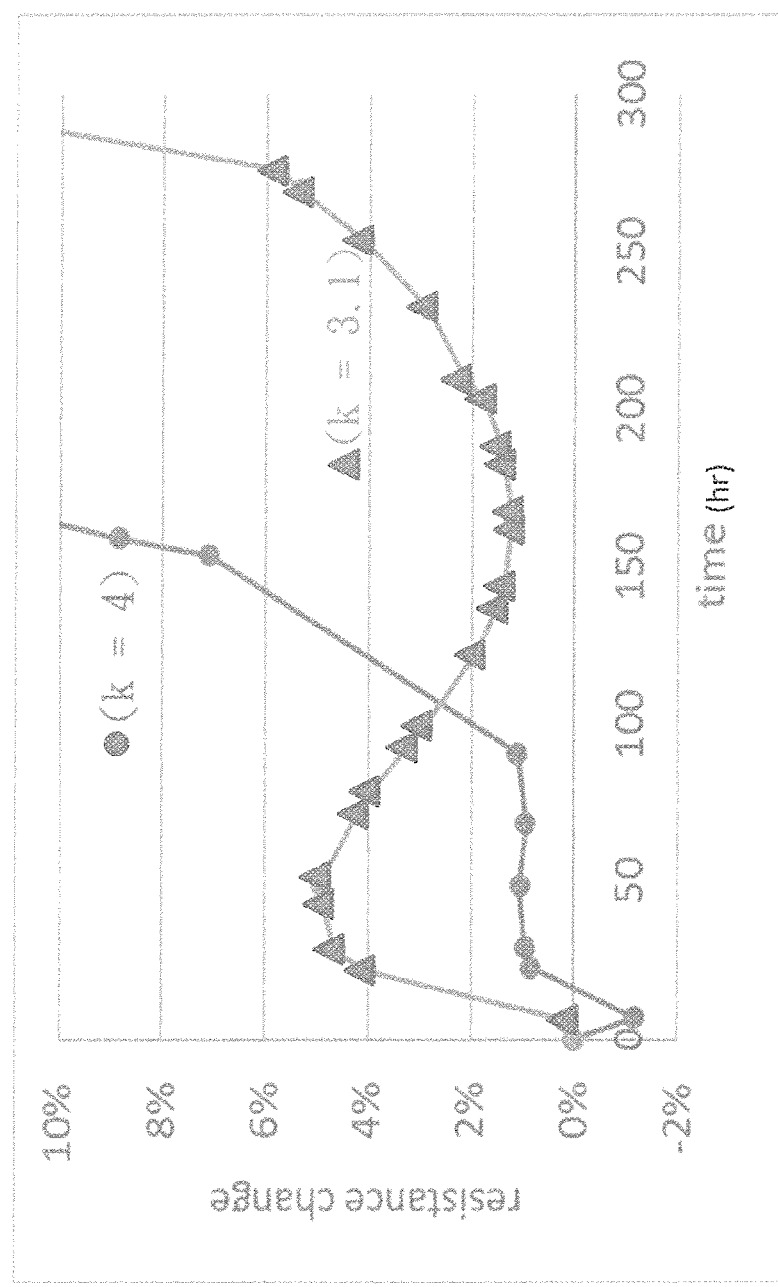
FIG. 10 and FIG. 11 are testing curves diagrams.

In one example, an operating voltage is separately applied to the structure in which the low-k insulating layer 160 directly contacts the first metal nanowire layer 140A (e.g. the experimental group, k=3.1) and the structure in which the insulating layer 160 without low-k directly contacts the first metal nanowire layer 140A (e.g. the control group, k=4.0). The above two structures are put into a high temperature and humidity environment to accelerate the test to record the resistance changes over time. As shown in FIG. 10, the resistance variation of the control group structure is nearly 10% when it comes to about 150 hours. The low-k insulating layer 160 can inhibit the electromigration of the metal nanowire 140, so as to produce about only 6% of resistance variation after 300 hours of testing. That is, when the resistance variation is lower than 10%, the structure in the example can effectively extend the service life of components made of metal nanowires.

Figure 5B:
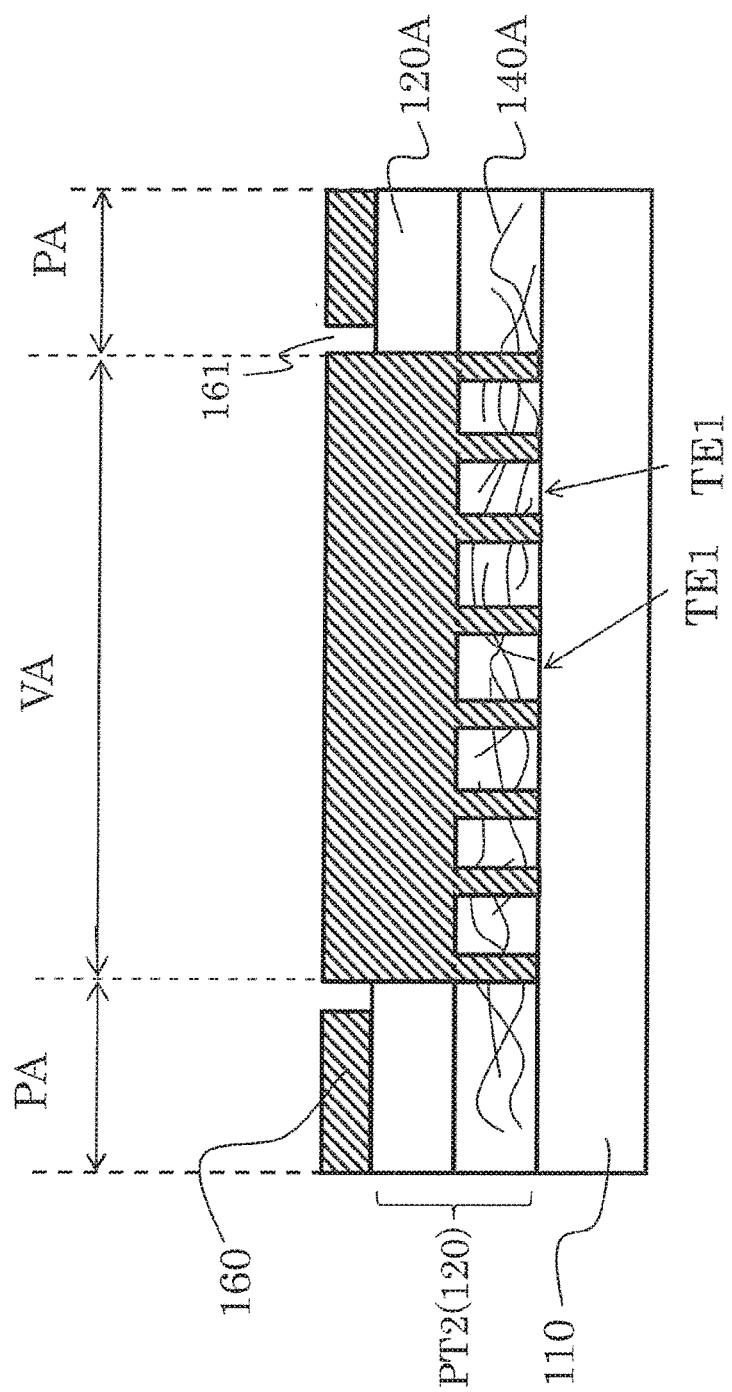
FIG. 5B is the cross-sectional diagram along line A-A of FIG. 5A.

The material of insulating layer 160 can completely or partially fill the gap etched in the first metal nanowire layer 140A or the conductive layer 120A. In addition, a proper process can be used in the formation of the insulating layer 160, such as using an etching process, a lithography process, or a laser process to manufacture the conductive hole 161. The conductive hole 161 corresponds to part of the peripheral wire 120, and the subsequently formed electrode structure will be connected with the peripheral wire 120 through the conductive hole 161. As shown in FIG. 5B, the conductive hole 161 corresponds to the second peripheral wire PT2 and exposes the second peripheral wire PT2. The location of the conductive hole 161 is approximately at the interface of the display area VA and the peripheral area PA, although the location of the conductive holes 161 can be adjusted according to specific needs.

Then, the second touch sensing electrode TE2 is manufactured on the insulating layer 160, and the second touch sensing electrode TE2 is connected with the corresponding peripheral wire 120. Specifically, this step can include: manufacturing the second metal nanowire layer 140B on the insulating layer 160 and patterning the second metal nanowire layer 140B to form the second touch sensing electrode TE2. The steps of manufacturing the nanowire layer and patterning can be both similar to embodiments mentioned above. In addition, the material of the second metal nanowire layer 140B can completely or partially fill the conductive hole 161, so that the second touch sensing electrode TE2 formed after patterning the second metal nanowire layer 140B is connected with the peripheral wire 120 disposed on the substrate 110. In one example, nitric acid can be used as etchant for patterning the second metal nanowire layer 140B. In one example, the second touch sensing electrode TE2 can be formed by the first protective layer, which is made of the second metal nanowire layer 140B and low-k or not low-k material. In other words, the second metal nanowire layer 140B can include the protective layer. For details, please refer to the content of the first metal nanowire layer 140A/the first touch sensing electrode TE1 mentioned above. As with the first metal nanowire layer 140A, low-k material, such as the insulating layer 160 or the first protective layer, can be adopted to inhibit the electromigration of the second metal nanowire layer 140B.

Referring to FIG. 6B, the second touch sensing electrode TE2 can be connected with the second peripheral wire PT2 on the substrate 110 through the conductive hole 161. In the example, the single second touch sensing electrode TE2 corresponds to a pair or a group of the second peripheral wires PT2. Respectively, the insulating layer 160 includes a pair of the conductive holes 161 disposed relative to the pair of the second peripheral wires PT2. The single second touch sensing electrode TE2 is electrically connected with the pair of the second peripheral wires PT2 through the pair of the conductive holes 161. The second touch sensing electrode TE2 forms a bridge structure on the insulating layer 160. In other words, the two ends of the bridge structure are respectively connected with the pair of the second peripheral wires PT2.

Figure 6A:
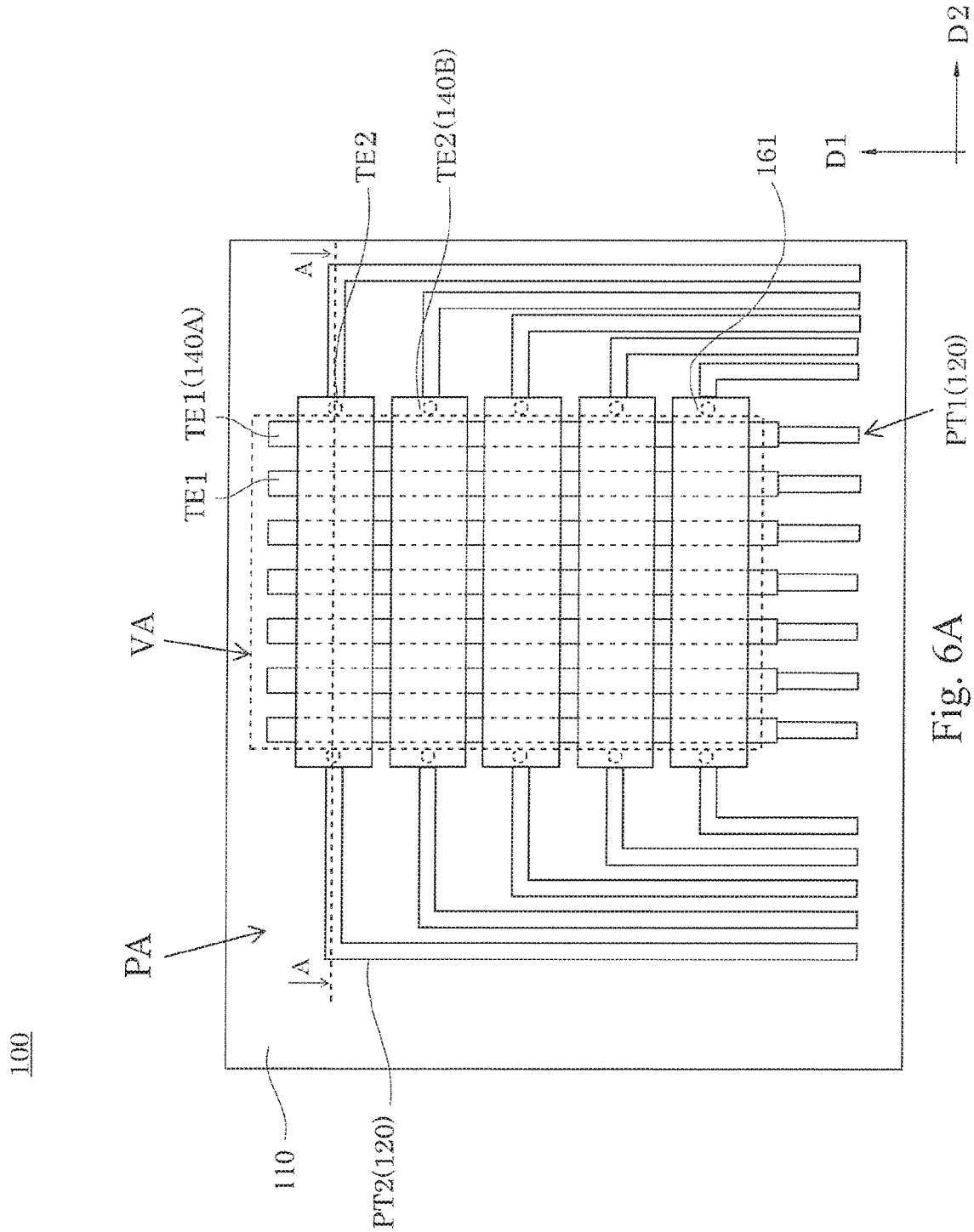
FIG. 6A is the schematic diagram of the fifth step of the method of manufacturing the touch panel according to some embodiments of the present disclosure.
Figure 6B:
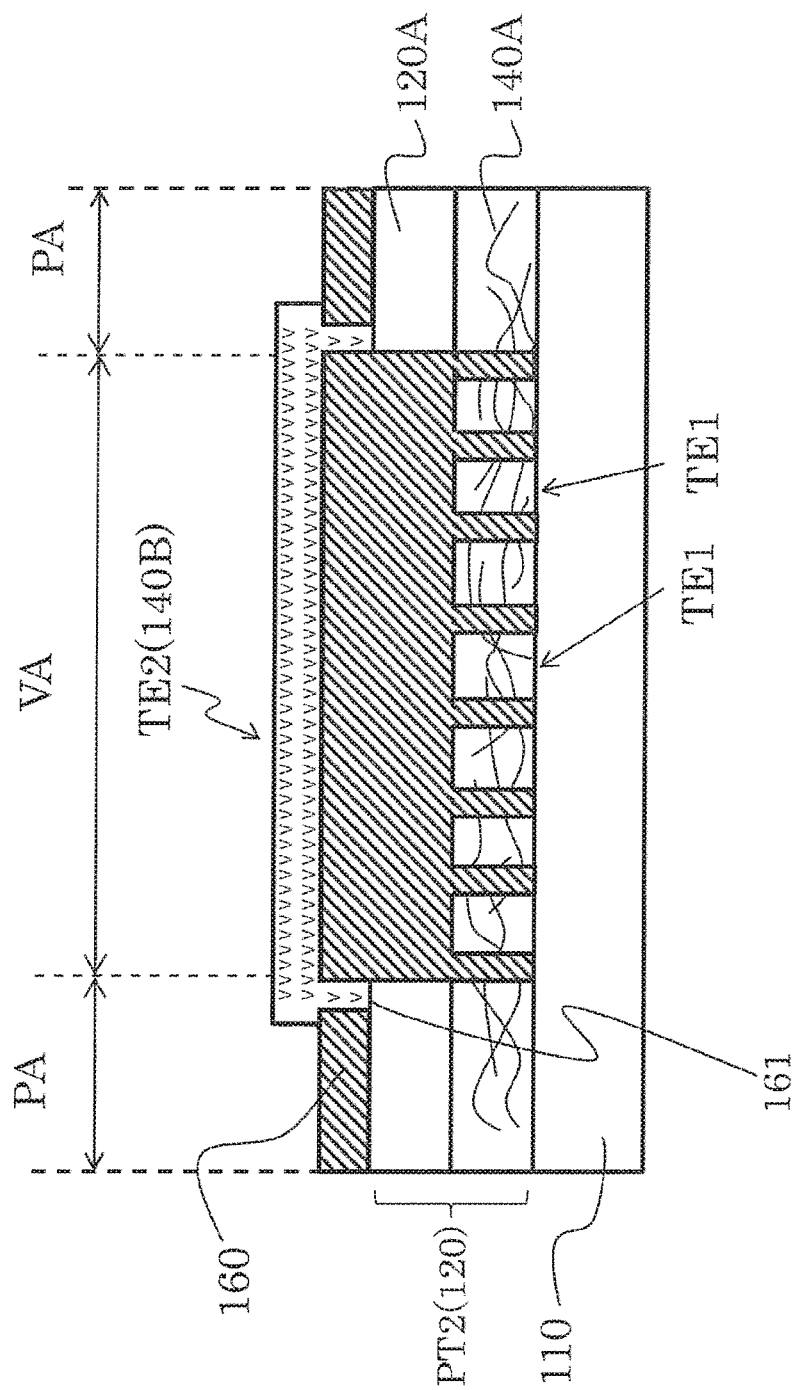
FIG. 6B is the cross-sectional diagram along line A-A of FIG. 6A.

Referring to FIG. 6A, the touch panel 100 of the present disclosure includes the substrate 110, the peripheral wire 120 including the conductive layer 120A and the first metal nanowire layer 140A, the first touch sensing electrode TE1 including the first metal nanowire layer 140A, the second touch sensing electrode TE2 including the second metal nanowire layer 140B, and the insulating layer 160 disposed between the first touch sensing electrode TE1 and the second touch sensing electrode TE2. The first touch sensing electrode TE1 and the second touch sensing electrode TE2 are electrically connected with the peripheral wire 120. The first metal nanowire layer 140A and/or the second metal nanowire layer 140B include the metal nanowire 140. In addition, the conductive layer 120A and the first metal nanowire layer 140A can be co-etched at once, in which the first touch sensing electrode TE1 and the peripheral wire 120 are simultaneously (in the same etching step) formed on the surface of the substrate 110.

In detail, in some embodiments of the present disclosure, the peripheral wire 120 includes the first peripheral wire PT1 and the second peripheral wire PT2, which connect to electrodes having different axial direction. Structurally, the first peripheral wire PT1 and the second peripheral wire PT2 are composite structure layers including two layers of patterned conductive structures, including the conductive layer 120A and the first metal nanowire layer 140A between the conductive layer 120A and the substrate 110. The conductive layer 120A forms the peripheral wire 120 and the first metal nanowire layer 140A (i.e. the second portion of the first metal nanowire layer 140A) have a co-etching surface (co-planar etch-surface). The first touch sensing electrode TE1 is formed after patterning the first metal nanowire layer 140A. That is, the first metal nanowire layer 140A forms the first touch sensing electrode TE1 in the display area VA and forms the lower structure of the peripheral wire 120 in the peripheral area PA. Thus, the first touch sensing electrode TE1 can be electrically connected with the peripheral wire 120 to transmit signals due to the conductivity of the first metal nanowire layer 140A. In addition, by the insulating layer 160, the first metal nanowire layer 140A can be electrically isolated from the second metal nanowire layer 140B. The capacitance between the first metal nanowire layer 140A and the second metal nanowire layer 140B can be used to sense the touch or gesture of a conductor, such as a finger. Signals of the first touch sensing electrode TE1 and the second touch sensing electrode TE2 formed after patterning will not affect each other. For example, the first touch sensing electrode TE1 arranged along the first direction D1 can be used to transmit external control signals, and the second touch sensing electrode TE2 arranged along the second direction D2 can be used to transmit touch sensing signals.

Figure 4D:
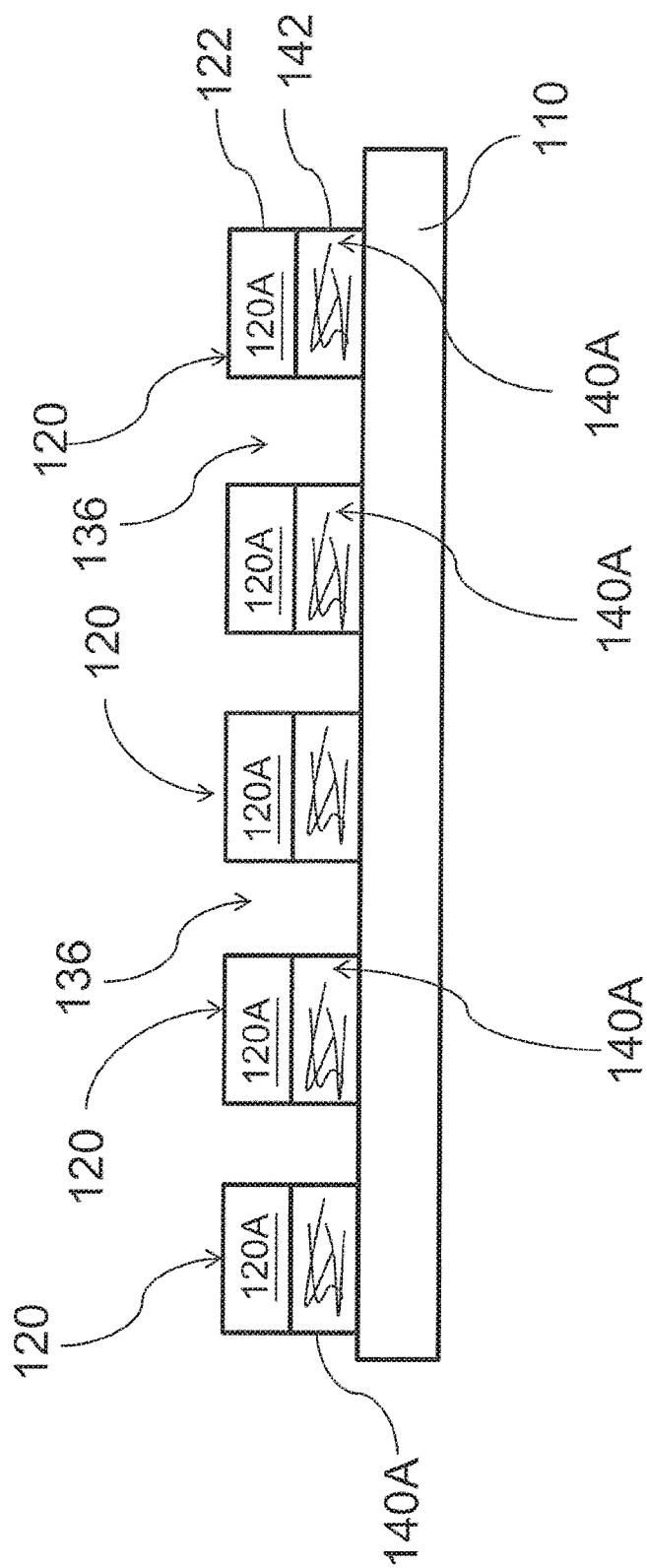
FIG. 4D is the cross-sectional diagram along line C-C of FIG. 4A.

Referring to FIG. 4A and FIG. 4D, in the peripheral area PA, a non-conductive area 136 is between the adjacent peripheral wire 120 (the second peripheral wire PT2 is used as an illustrative example here) to electrically block the adjacent peripheral wires 120 to avoid short circuit. That is, the non-conductive area 136 is formed between the first sidewall 122 of the adjacent conductive layer 120A. The non-conductive area 136 is also formed between the second sidewall 142 of the adjacent first metal nanowire layer 140A. In the example of the present disclosure, the non-conductive area 136 is a gap in order to block the adjacent peripheral wire 120. In one example, the etching process mentioned above can be adopted to form the gap, thus the first sidewall 122 and the second sidewall 142 are the co-etched surface. That is, the first sidewall 122 and the second sidewall 142 are formed in the same etching step and by the same etchant. Or, the first sidewall 122 can be etched firstly, and the second sidewall 142 can be etched secondly. In one example, the second sidewall 142 of the first metal nanowire layer 140A will not have any metal nanowire due to the steps mentioned above. Moreover, the conductive layer 120A and the first metal nanowire layer 140A will have the same or similar pattern and size, such as long straight patterns of the same width or approximate width.

Similarly, in the display area VA, the non-conductive area 136 is between the adjacent first touch sensing electrodes TE1 to electrically block the adjacent first touch sensing electrodes TE1 to avoid short circuit. The non-conductive area 136 is also between the adjacent second touch sensing electrodes TE2. In one example, the etching process mentioned above can be adopted to manufacture the gap between the adjacent first touch sensing electrodes TE1 or the gap between the adjacent second touch sensing electrodes TE2.

In the embodiment, the first touch sensing electrode TE1 and the second touch sensing electrode TE2 are arranged in staggered form. For example, the first touch sensing electrode TE1 is a strip electrode extending along the first direction D1 and the second touch sensing electrode TE2 is a strip electrode extending along the second direction D2 and form a staggered structure with each other. In other embodiments, the first touch sensing electrode TE1 and/or the second touch sensing electrode TE2 can have proper shapes, such as quadrilateral or hexagonal structures connected in series. The scope of the disclosure should not be limited by the embodiments.

In the embodiment, the first touch sensing electrode TE1 and/or the second touch sensing electrode TE2 of the display area VA preferably have conductivity and transparency. Thus, the nanowire layer, which forms the first touch sensing electrode TE1 and/or the second touch sensing electrode TE2, preferably have the following properties: the transmission of visible light (e.g. wavelength from 400 nm to 700 nm) is higher than about 80%, and the surface resistance is from about 10 to 1000 ohm/square. Preferably, the transmission of visible light (e.g. wavelength from 400 nm to 700 nm) of the nanowire layer is higher than about 85%, and the surface resistance is from about 50 to 500 ohm/square.

Figure 7:
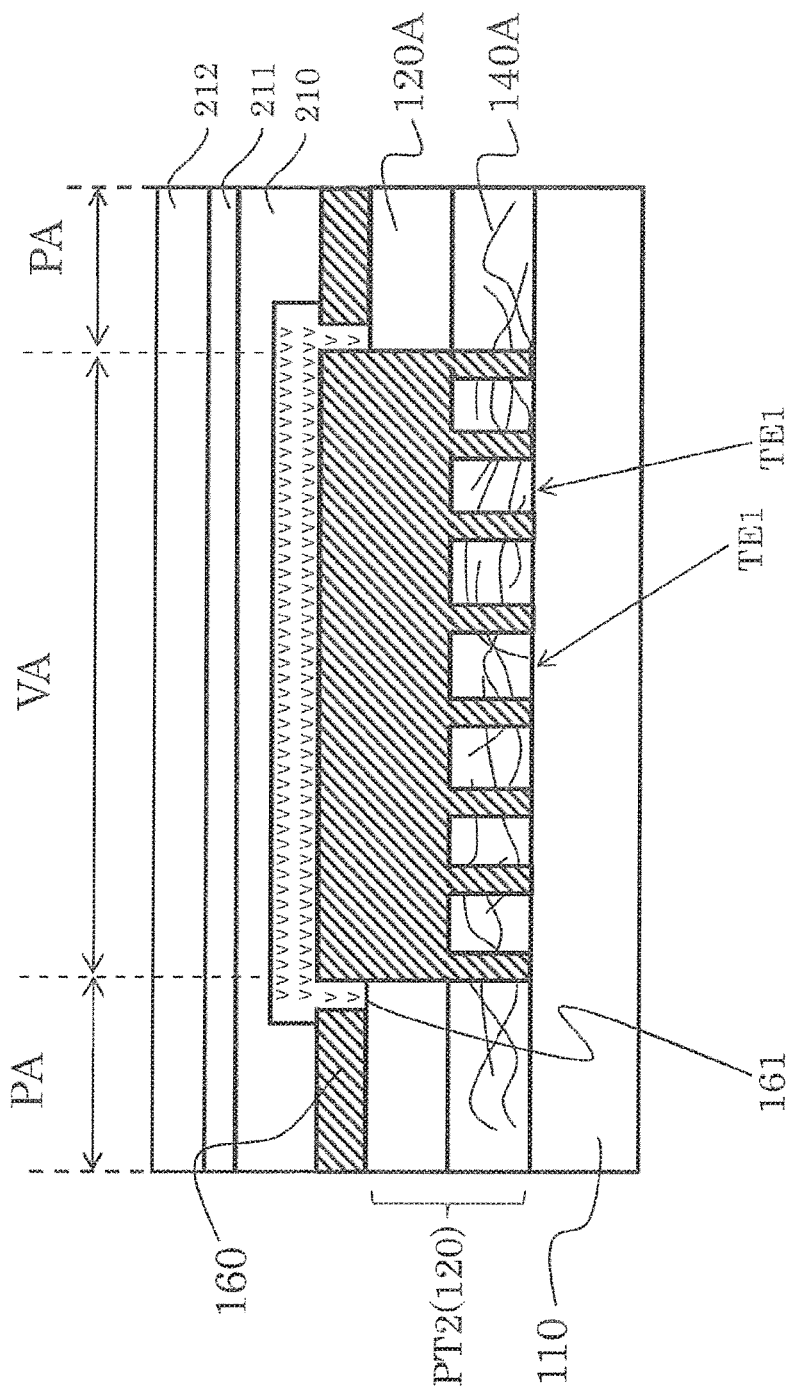
FIG. 7 is the schematic diagram of the touch panel according to some embodiments of the present disclosure.
Figure 11:
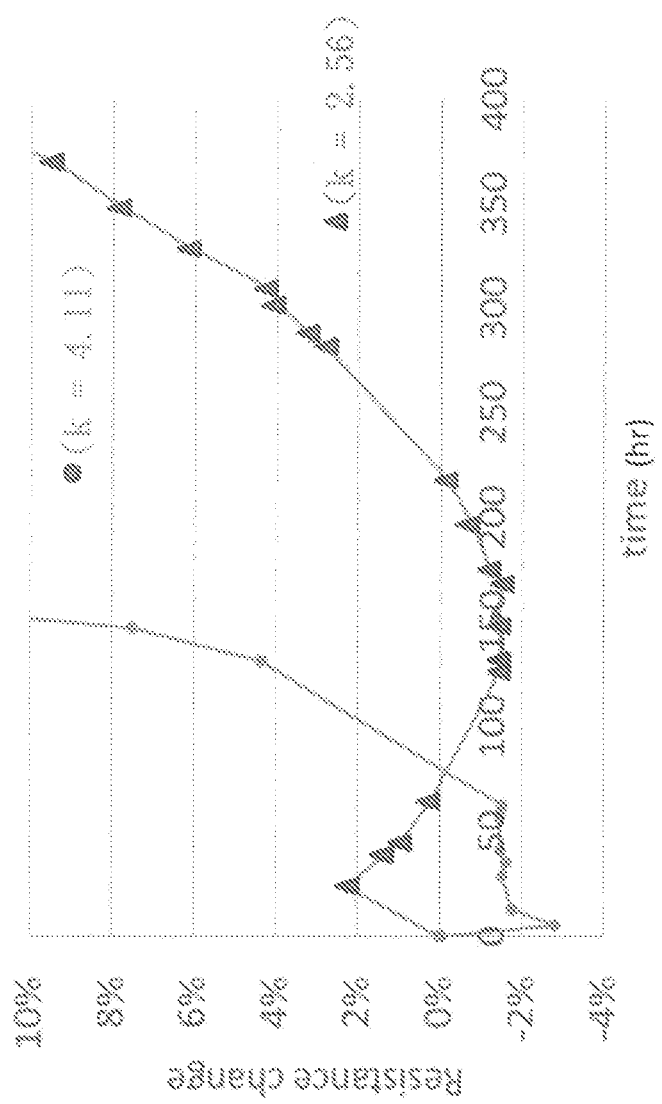

In one example, the touch panel 100 completed in the aforementioned steps can combine with the following process. Referring to FIG. 7, one or more additive structure layers can be formed in the stacks mentioned above. In one example, the touch panel 100 completed in the aforementioned steps further includes the second protective layer 210 (passivation), which covers the sensing electrode (e.g. the first touch sensing electrode TE1 and/or the second touch sensing electrode TE2) and the peripheral wire 120. In one example, the touch panel 100 completed in the aforementioned steps can adhere to a covering layer 212. For example, the second protective layer 210 (passivation) is firstly formed on the touch panel 100, and the specific description of the second protective layer 210 can refer to the aforementioned description of the first protective layer. The adhesive layer 211 is between the second protective layer 210 and the covering layer 212, in which the adhesive layer 211 can be optical clear adhesive (OCA). In one example, the adhesive layer 211 can be a low-k OCA (e.g. rubber OCA with k=2.56 under the measuring condition of 100 kHz). In addition, a general non low-k OCA (k=4.11 under the measuring condition of 100 kHz) is selected as the control group for the test. As shown in FIG. 11, the resistance variation of the control group is nearly 10% at about 150 hours. The low-k OCA can inhibit the electromigration of the metal nanowire to make 10% resistance variation occur after 400 hours of the component tested time. That is, when the low-k material does not directly contact the structure of the metal nanowire (e.g. the first touch sensing electrode TE1 and/or the second touch sensing electrode TE2), the example can also extend the service life of the component made of the metal nanowire. It is worth noting that if the low-k material used in the touch panel 100 of the example (such as the insulating layer 160 or the first protective layer) has achieved the effect of reducing electromigration, then the adhesive layer 211 can also use the non-low-k OCA. Similarly, a polymer with a non-low-k value can be used in the second protective layer 210.

The embodiment of the present disclosure provides another method of manufacturing the touch panel, in which the main difference from the aforementioned first method is at least in the following aspects. In the example, the conductive layer 120A is firstly formed in the peripheral area PA, and then the first metal nanowire layer 140A is formed. Then, based on the aforementioned method, the first touch sensing electrode TE1 and the peripheral wire 120 are formed in the patterning step, and then the insulating layer 160 is formed. Finally, the second touch sensing electrode TE2 is formed.

Figure 8A:
FIG. 8A to FIG. 8D are schematic diagrams of steps of the method of manufacturing the touch panel according to some embodiments of the present disclosure.
Figure 8B:
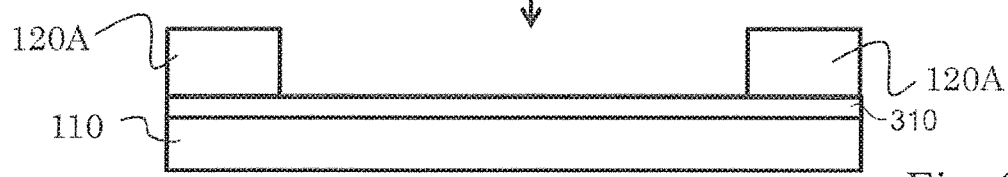
Figure 8C:
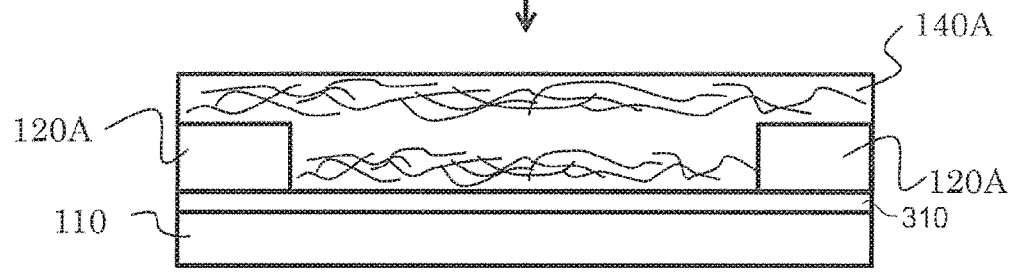
Figure 8D:
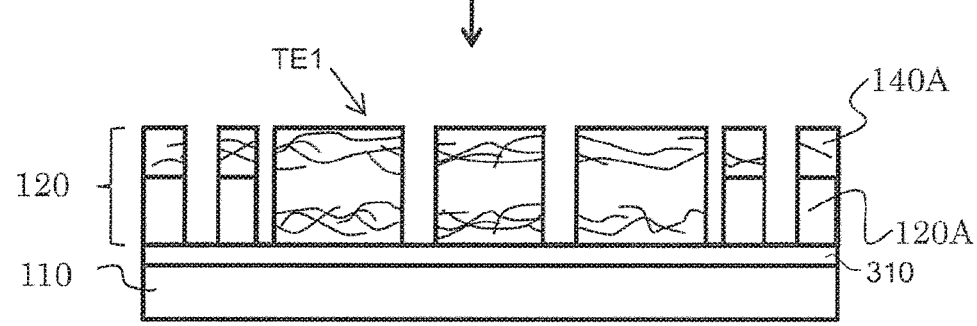

Specific methods can be illustrated as follows: in FIG. 8A, the conductive layer 120A is firstly formed on the surface of the substrate 110 (the upper surface). In one example, the upper surface of the substrate 110 can be firstly coated with a low-k material layer 310. Specific details of the example are similar to that referenced above and will not be repeated. As shown in FIG. 8B, after the etching process, the conductive layer 120A located on the display area VA is removed, while the remaining conductive layer 120A is approximately located on the peripheral area PA. The above is the first patterning process. Next, the first metal nanowire layer 140A is formed in the peripheral area PA and the display area VA. The first portion of the first metal nanowire layer 140A is directly formed on the surface of the substrate 110, and the second portion of the first metal nanowire layer 140A covers the conductive layer 120A (as shown in FIG. 8C). Then the second patterning process is carried out by using the co-etching process. In the patterning step, the first metal nanowire layer 140A in the display area VA forms the first touch sensing electrode TE1 after the etching process. The conductive layer 120A and the first metal nanowire layer 140A located on the peripheral area PA can be patterned by the etching process similarly, to form the peripheral wire 120 (as shown in FIG. 8D). Next, the insulating layer 160 and the second touch sensing electrode TE2 are formed. The embodiment of the two steps is similar to the above embodiments and shall not be repeated here.

Figure 9:
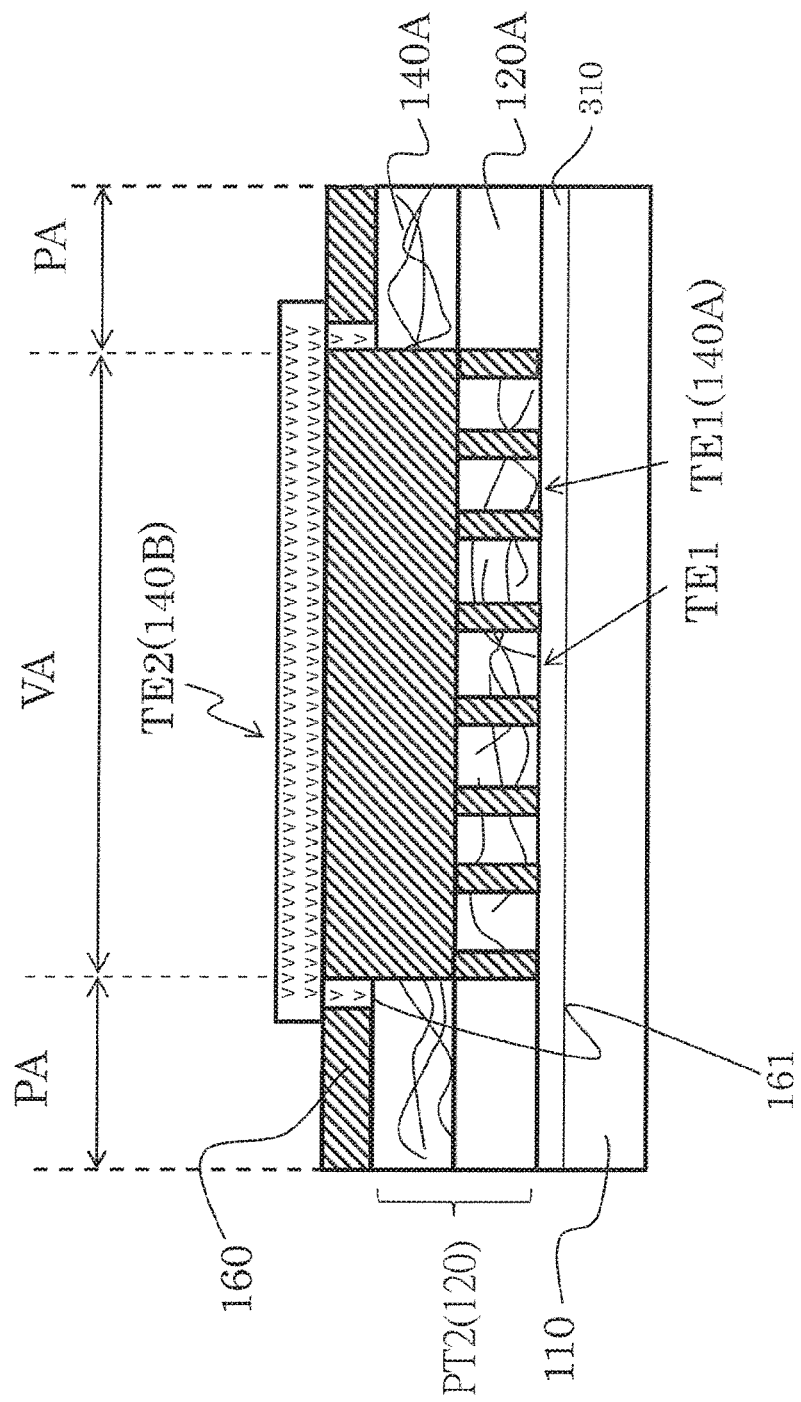
FIG. 9 is the schematic diagram of the touch panel according to some embodiments of the present disclosure.

FIG. 9 is the schematic diagram of the touch panel according to the manufacturing method of FIG. 8A to FIG. 8D. Specific details of the example are similar to that referenced above and will not be repeated. Compared with FIG. 6A, in the structure shown in FIG. 9, the peripheral wire 120 located on the peripheral area PA is a double layer structure in which the first metal nanowire layer 140A is above the conductive layer 120A relative to the substrate 110. That is, in such structure, even if the first protective layer is used to protect the metal nanowire 140, the metal nanowire 140 is still in direct contact with the conductive layer 120A. Thus, there is a lower contact resistance between the metal nanowire 140 and the conductive layer 120A, which further reduces the loss and distortion of the transmission of touch signals. The low-k material layer 310 can inhibit electromigration of the metal nanowire 140 in the structure (no matter whether the metal nanowire 140 is in direct contact with the low-k material layer 310 or not), and extend the service life of components.

Same as the aforementioned example, materials such as the low-k insulating layer 160, the low-k OCA, or the low-k first/second protective layer all can be applied to the touch panel shown in FIG. 9.

Figure 12A:
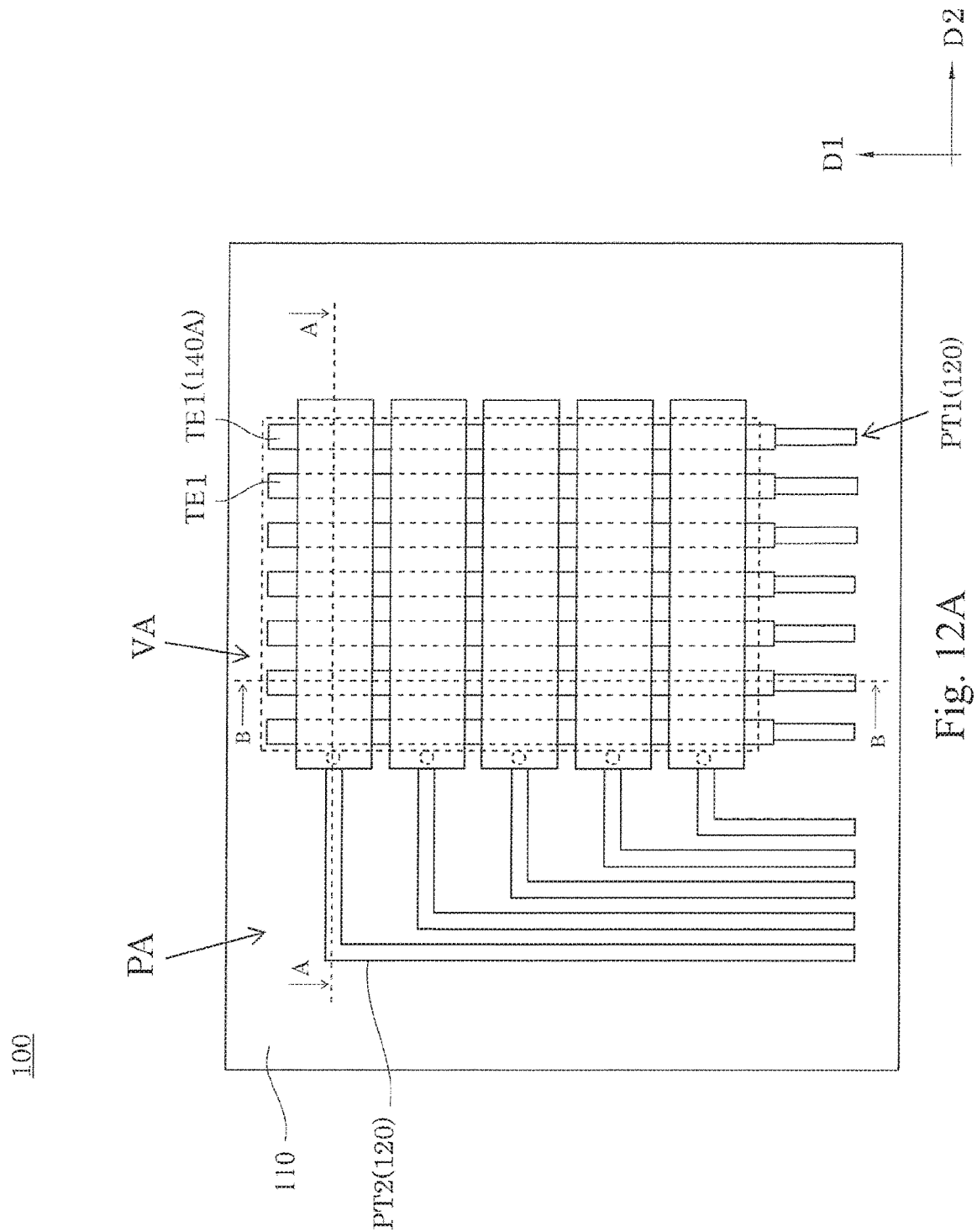
FIG. 12A is the schematic diagram of the touch panel according to some embodiments of the present disclosure.
Figure 12B:
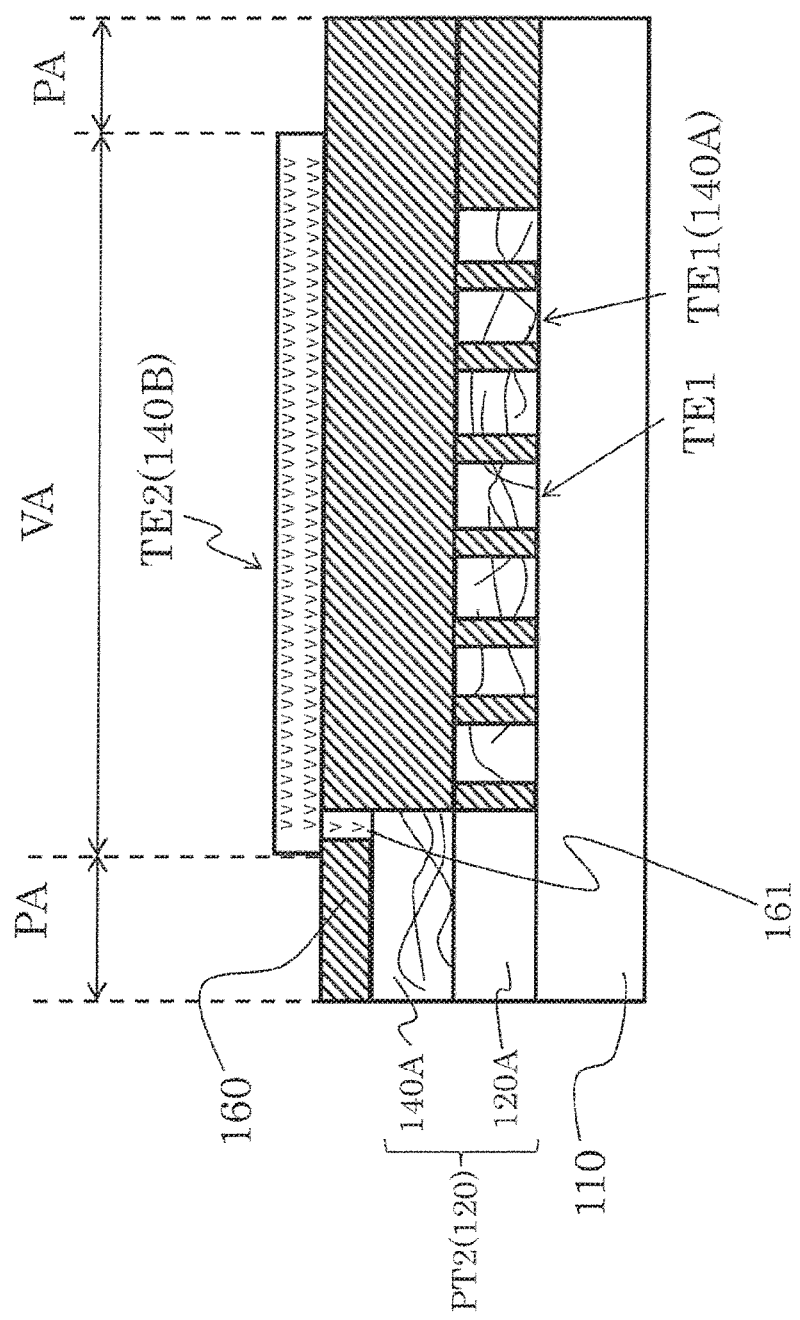
FIG. 12B is the cross-sectional diagram along line A-A of FIG. 12A.
Figure 12C:
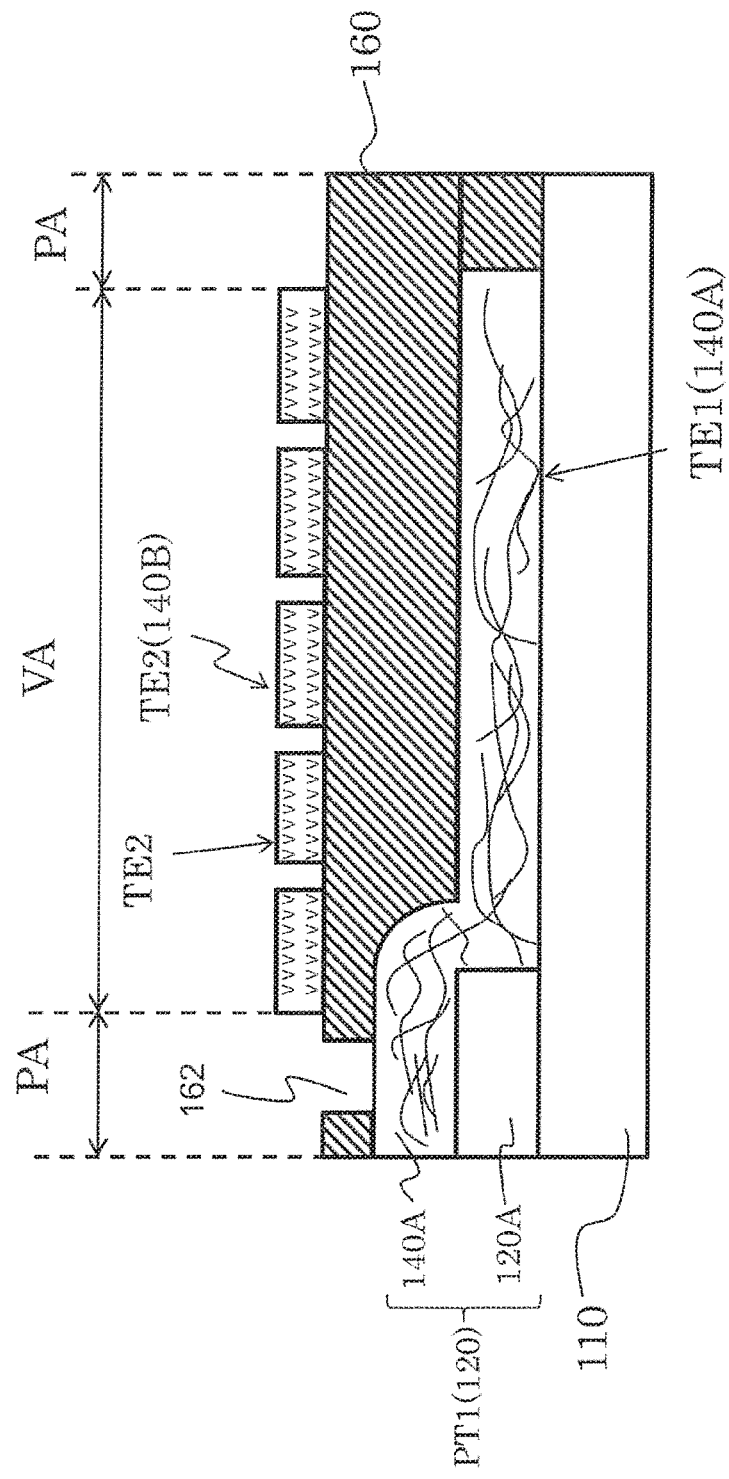
FIG. 12C is the cross-sectional diagram along line B-B of FIG. 12A.

FIG. 12A is another schematic diagram of the touch panel according to the manufacturing method of FIG. 8A to FIG. 8D. FIG. 12B and FIG. 12C respectively correspond to the cross-sectional diagrams along line A-A and line B-B of FIG. 12A. As shown in FIG. 12A, the second peripheral PT2 is only formed on one side of the second touch sensing electrode TE2. FIG. 12B also illustrates that the second touch sensing electrode TE2 is electrically connected with the second peripheral PT2 through the conductive hole 161. That is, the insulating layer 160 is disposed with many conductive holes 161. Every conductive hole 161 is located on the corresponding second peripheral wire PT2. In one example, the insulating layer 160 has the opening 162 corresponding to the peripheral wire 120, which is used to connect with the external circuit. As shown in FIG. 12C, the insulating layer 160 has the opening 162 exposing the first peripheral PT1 to connect the first peripheral PT1 with the external circuit (e.g. control IC). Similarly, the insulating layer 160 also has the opening 162 exposing the second peripheral PT2 to connect the second peripheral PT2 with the external circuit. Specific details of the example are similar to that referenced above and will not be repeated.

Figure 13A:
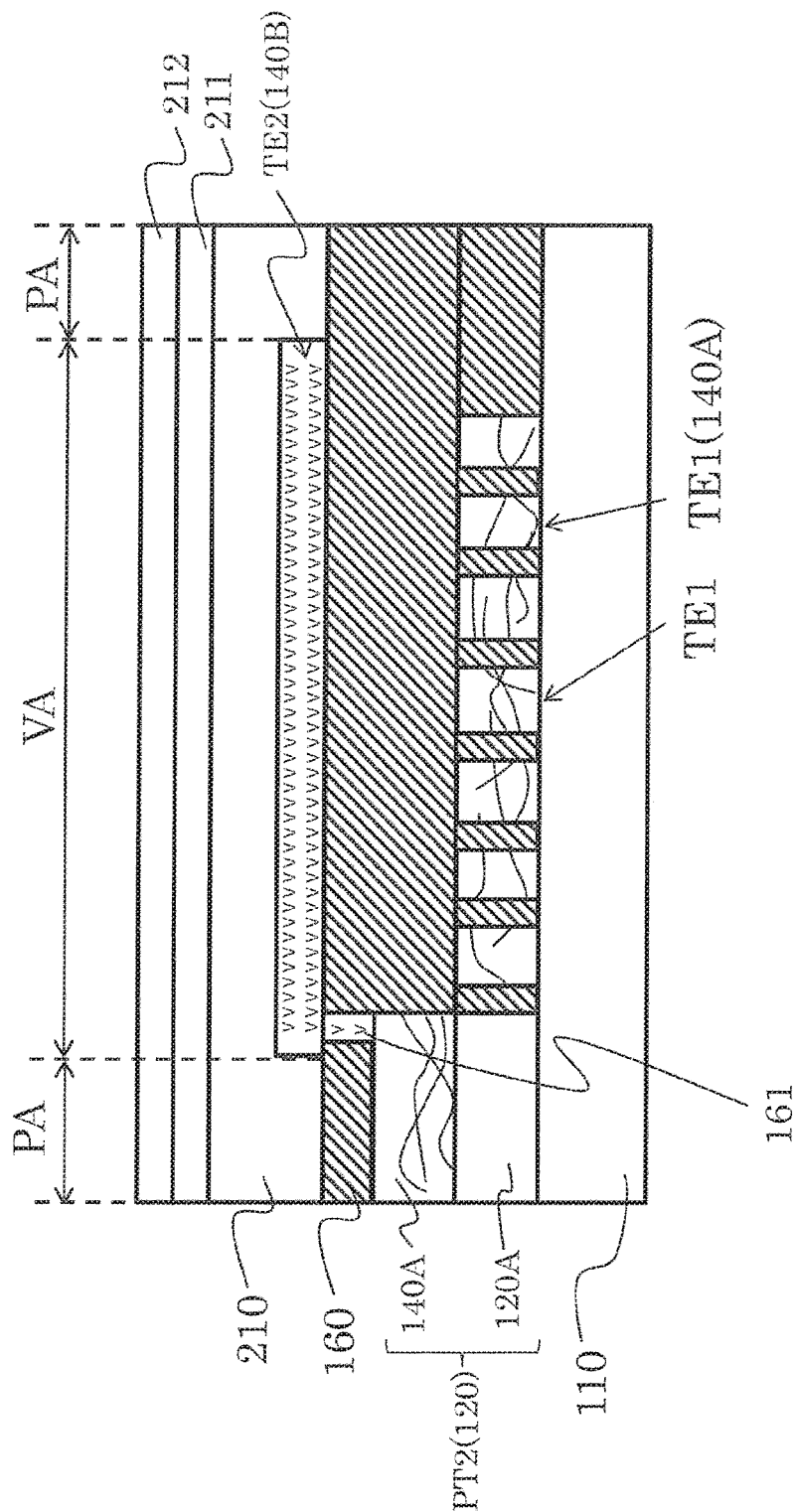
FIG. 13A is the cross-sectional diagram after assembly in FIG. 12B.
Figure 13B:
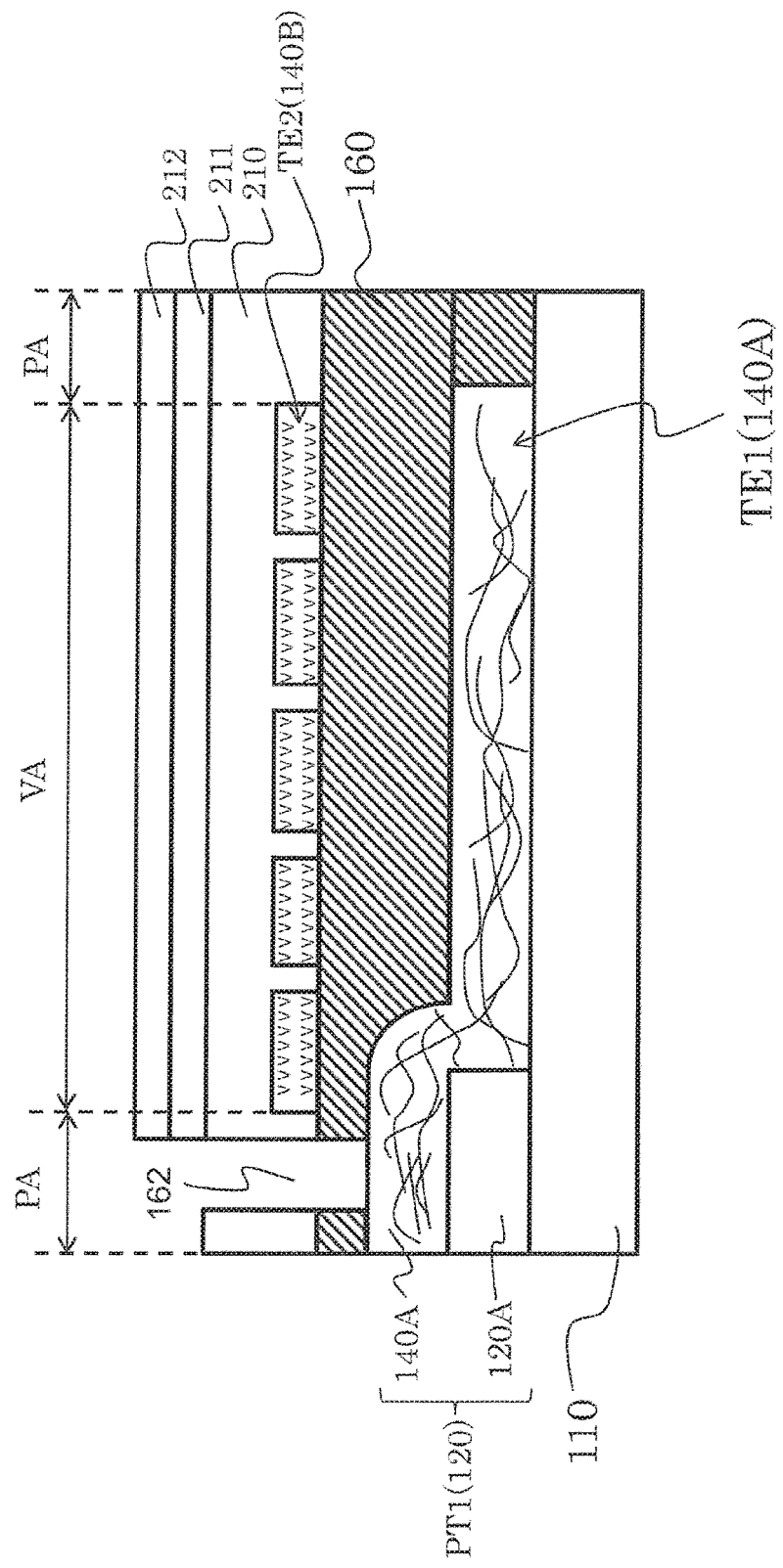
FIG. 13B is the cross-sectional diagram after assembly in FIG. 12C.

The touch panel 100 of FIG. 12A can assemble with the covering layer 212, the second protective layer 210, and the adhesive layer 211. FIG. 13A and FIG. 13B respectively illustrate cross-sectional diagrams of structures of FIG. 12B and FIG. 12C after assembling with the covering layer 212, the second protective layer 210, and the adhesive layer 211. The second protective layer 210 can be formed of thicker low-k materials. The connecting hole will be disposed on the second protective layer 210 corresponding to the insulating layer 160 (the opening 162 and the connecting hole can both be referred to as the opening 162, as shown in FIG. 13B), in order to electrically connect the peripheral wire 120 with the external wire.

In one embodiment, the aforementioned metal nanowire 140 can be further post-processed to improve their conductivity, which includes processes and steps of heating, plasma, corona discharge, UV ozone, or pressure. For example, after steps of forming the first metal nanowire layer 140A and the second metal nanowire layer 140B by solidifying, pressure can be applied by means of the roller. In one example, one or more rollers can be used to apply pressure of 50 to 3400 psi on the metal nanowire layer, preferably 100 to 1000 psi, 200 to 800 psi or 300 to 500 psi. In some embodiments, the post-processing of heating and pressure can be performed at the same time. In detail, pressure can be applied to the formed metal nanowire 140 by one or more roller and heated simultaneously. For example, the pressure applied by the roller can be 10 to 500 psi, preferably 40 to 100 psi. Simultaneously, the roller can be heated to from about 70° C. to 200° C., preferably from about 100° C. to 175° C., which can improve the conductivity of the first metal nanowire layer 140A and the second metal nanowire layer 140B. In some embodiments, the metal nanowire 140 can be post-processed, preferably under exposing to reductant. For example, the metal nanowire 140 including the silver nanowire can be post-processed, preferably under exposing to silver reductant. The silver reductant includes borohydride such as sodium borohydride, boron nitrides such as dimethylamine boranes (DMAB), or a gas reductant such as hydrogen ($H_2$). The exposing time is about 10 sec. to 30 min., preferably about 1 to 10 min. The pressure applying step can be applied to desired steps based on actual demand.

In a different example of the present disclosure, the structure, material, and process may refer to each other, and are not limited by embodiments mentioned above.

In some embodiments of the present disclosure, the low-k material layer can mitigate the failure of silver nanowire and other metal nanowires due to electromigration and extend the service life of components. In some embodiments of the present disclosure, at least one layer in stack layer can be low-k material to mitigate the failure of silver nanowire and other metal nanowires due to electromigration. In some embodiments of the present disclosure, at least one of the first protective layer, the second protective layer, the insulating layer, or the adhesive layer is a low-k material.

In some embodiments of the present disclosure, the low-k material layer may or may not have direct contact with the metal nanowires to inhibit electromigration. The low-k material layer has flexibility on the component overlay collocation, which can be designed based on the actual product.

In some embodiment of the present disclosure, the low-k protective layer or the low-k OCA can be selected, thus the effect of inhibiting electromigration and protecting silver nanoparticles can be achieved simultaneously only by monolayer during processing. Thus, the manufacturing efficiency will be improved and process cost will be reduced.

In some embodiments of the present disclosure, the low-k OCA can be selected, thus the effect of inhibiting electromigration and assembling other material layers can be achieved simultaneously only by monolayer during processing. Thus, the manufacturing efficiency will be improved and process cost will be reduced.

In some embodiments of the present disclosure, the coating process of the peripheral metal layer applied to the biaxial touch sensing electrode can be reduced to one time. Then, the process can be simplified by being connected with the first touch sensing electrode and the second touch sensing electrode located at the upper and lower surfaces of the insulating layer.

In some embodiments of the present disclosure, an initial process can start with the metal nanowire layer or the metal layer (i.e. the conductive layer) based on demand, so the process is flexible.

In some embodiments of the present disclosure, the conductive layer in the peripheral area can directly contact with the metal nanowire layer to form the peripheral wire. Thus, as a whole, the metal nanowire and the peripheral wire in the metal nanowire layer will form the signal transmission path with direct contact and low resistance, which will be used to transmit the control signal and the touch sensing signal between the touch sensing electrode and the external controller. Moreover, the low resistance will reduce the loss of signal transmission and solve the problem of high contact resistance in traditional structures.

In some embodiments of the present disclosure, a low resistance peripheral conductive wire can be formed to improve the ability of touch signal transmission and reduce the loss and the distortion of touch signal transmission.

In some embodiments of the present disclosure, the composite structure layer in the peripheral wire can be formed in a single etching process. Thus, it can be applied to the manufacturing of the touch panel, which simplifies the patterning process of the peripheral wire. Thus, the manufacturing efficiency will be improved and process cost will be reduced.

In some embodiments of the present disclosure, the composite structure layer in the peripheral wire can be formed in a single etching process. Thus, it can reduce the alignment times in process and avoid error in the step of aligning, as well as improve the yield.

In some embodiments of the present disclosure, the composite structure layer in the peripheral wire can be formed in a single etching process. Thus, the aligning error space reserved in the process can be saved and the width of the peripheral area can be effectively reduced.

In some embodiments of the present disclosure, the optical function layer is formed on the other side of the substrate (relative to the touch sensing electrode), which can form a highly integrated product with both touch and optical functions.

In some embodiments of the present disclosure, the process can be combined with the roll-to-roll production technology to perform the manufacturing of continuous and large batches of single-side/double-side electrode touching panel.

Although some embodiments are described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the described embodiments without departing from the scope or spirit of the claimed invention. In view of the foregoing, it is intended that the present disclosure cover modifications and variations of the described embodiments provided they fall within the scope of the following claims.

What is claimed is:

1. A touch panel having a display area and a peripheral area, the touch panel comprising:
   a substrate;
   a first touch sensing electrode disposed on a first surface of the substrate and located at the display area, wherein the first touch sensing electrode comprises a first portion of a patterned first metal nanowire layer;
   a first peripheral wire and a second peripheral wire disposed on the first surface of the substrate and located at the peripheral area, wherein the first peripheral wire is electrically connected with the first touch sensing electrode, the first peripheral wire and the second peripheral wire comprise a conductive layer and a second portion of the patterned first metal nanowire layer, the conductive layer is non-transparent, and the conductive layer and the second portion of the patterned first metal nanowire layer have a co-etched surface;
   an insulating layer covering the first touch sensing electrode and the second peripheral wire, wherein the insulating layer comprises a conductive hole disposed relative to the second peripheral wire, and the insulating layer is made of polymer with a dielectric constant lower than 3.5 or equal to 3.5 under a measuring condition; and
   a second touch sensing electrode disposed on the insulating layer, wherein the second touch sensing electrode comprises a patterned second metal nanowire layer, and the second touch sensing electrode is electrically connected with the second peripheral wire through the conductive hole.

2. The touch panel of claim 1, wherein the second portion of the patterned first metal nanowire layer is disposed on the first surface of the substrate, and the conductive layer is disposed on the second portion of the patterned first metal nanowire layer, or the conductive layer is disposed on the first surface of the substrate, and the second portion of the patterned first metal nanowire layer is disposed on a top surface of the conductive layer.

3. The touch panel of claim 1, wherein the patterned first metal nanowire layer or the patterned second metal nanowire layer further comprises a first protective layer, and a dielectric constant of the first protective layer is lower than 3.5 or equal to 3.5 under the measuring condition.

4. The touch panel of claim 1, wherein the patterned first metal nanowire layer further comprises a first protective layer, a dielectric constant of the first protective layer is higher than 3.5 under the measuring condition, and the patterned first metal nanowire layer does not contact directly with the polymer with the dielectric constant lower than 3.5 or equal to 3.5 under the measuring condition.

5. The touch panel of claim 1, further comprising a second protective layer made of polymer with a dielectric constant lower than 3.5 or equal to 3.5 under the measuring condition, wherein an opening is disposed in the second protective layer and the insulating layer.

6. The touch panel of claim 5, further comprising an adhesion layer on the second protective layer.

7. The touch panel of claim 6, wherein the adhesion layer is an optical clear adhesive with a dielectric constant lower than 3.5 or equal to 3.5 under the measuring condition.

8. A method of manufacturing a touch panel having a display area and a peripheral area, comprising:
fabricating a first metal nanowire layer comprising metal nanowires on a first surface of a substrate;
fabricating a conductive layer on the first metal nanowire layer;
performing a first patterning process, comprising patterning the first metal nanowire layer located at the display area, and simultaneously patterning the conductive layer and the first metal nanowire layer located at the peripheral area to form a first peripheral wire and a second peripheral wire;
removing the conductive layer located at the display area to expose a first touch sensing electrode formed by patterning the first metal nanowire layer located at the display area;
fabricating an insulating layer to cover the first touch sensing electrode and the second peripheral wire, wherein the insulating layer comprises a conductive hole disposed relative to the second peripheral wire, and the insulating layer is made of a material with a dielectric constant lower than 3.5 or equal to 3.5 under a measuring condition; and
fabricating a second touch sensing electrode on the insulating layer, wherein the second touch sensing electrode is electrically connected with the second peripheral wire through the conductive hole.

9. The method of manufacturing the touch panel of claim 8, wherein the fabricating the second touch sensing electrode on the insulating layer comprises:
fabricating a second metal nanowire layer comprising metal nanowires on the insulating layer; and
performing a second patterning process to form the second touch sensing electrode by patterning the second metal nanowire layer.

10. The method of manufacturing the touch panel of claim 9, wherein the first metal nanowire layer or the second metal nanowire layer further comprises a first protective layer.

11. The method of manufacturing the touch panel of claim 8, wherein the performing the first patterning process comprises simultaneously etching the conductive layer and the first metal nanowire layer by using a first etchant.

12. The method of manufacturing the touch panel of claim 11, wherein the removing the conductive layer located at the display area comprises removing the conductive layer located at the display area by using a second etchant.

13. The method of manufacturing the touch panel of claim 8, further comprising forming a second protective layer on the insulating layer, wherein the second protective layer is made of polymer with a dielectric constant lower than 3.5 or equal to 3.5 under the measuring condition, and an opening is formed in the second protective layer and the insulating layer.

14. The method of manufacturing the touch panel of claim 13, further comprising forming an adhesion layer on the second protective layer.

15. The method of manufacturing the touch panel of claim 14, wherein the adhesion layer is an optical clear adhesive with a dielectric constant lower than 3.5 or equal to 3.5 under the measuring condition.

16. A method of manufacturing a touch panel having a display area and a peripheral area, comprising:
fabricating a conductive layer on a first surface of a substrate;
removing the conductive layer located at the display area;
fabricating a first metal nanowire layer comprising metal nanowires on the first surface of the substrate and on a surface of the conductive layer;
performing a first patterning process, comprising patterning the first metal nanowire layer located at the display area to form a first touch sensing electrode, and simultaneously patterning the conductive layer and the first metal nanowire layer located at the peripheral area to form a first peripheral wire and a second peripheral wire;
fabricating an insulating layer to cover the first touch sensing electrode and the second peripheral wire, wherein the insulating layer comprises a conductive hole disposed relative to the second peripheral wire, and the insulating layer is made of a material with a dielectric constant lower than 3.5 or equal to 3.5 under a measuring condition; and
fabricating a second touch sensing electrode on the insulating layer, wherein the second touch sensing electrode is electrically connected with the second peripheral wire through the conductive hole.

17. The method of manufacturing the touch panel of claim 16, wherein the fabricating the second touch sensing electrode on the insulating layer comprises:
fabricating a second metal nanowire layer comprising metal nanowires on the insulating layer; and
performing a second patterning process to form the second touch sensing electrode by patterning the second metal nanowire layer.

18. The method of manufacturing the touch panel of claim 16, wherein the removing the conductive layer located at the display area comprises removing the conductive layer located at the display area by using a first etchant and simultaneously etching the conductive layer and the first metal nanowire layer by using a second etchant.

19. The method of manufacturing the touch panel of claim 16, further comprising forming a second protective layer on the insulating layer, wherein the second protective layer is made of polymer with a dielectric constant lower than 3.5 or equal to 3.5 under the measuring condition, and an opening is formed in the second protective layer and the insulating layer.

20. The method of manufacturing the touch panel of claim 19, further comprising forming an adhesion layer with a dielectric constant lower than 3.5 or equal to 3.5 under the measuring condition on the second protective layer.

* * * * *